(12) United States Patent
Ishida et al.

(10) Patent No.: US 9,186,906 B2
(45) Date of Patent: Nov. 17, 2015

(54) RECORDING-MEDIUM IMAGING DEVICE AND IMAGE FORMING APPARATUS

(71) Applicant: CANON KABUSHIKI KAISHA, Tokyo (JP)

(72) Inventors: Tsutomu Ishida, Mishima (JP); Shunichi Ebihara, Suntou-gun (JP); Norio Matsui, Mishima (JP); Shoichi Koyama, Susono (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/305,878

(22) Filed: Jun. 16, 2014

(65) Prior Publication Data

US 2014/0292993 A1    Oct. 2, 2014

Related U.S. Application Data

(60) Continuation of application No. 13/887,122, filed on May 3, 2013, now Pat. No. 8,798,489, which is a division of application No. 12/793,559, filed on Jun. 3, 2010, now Pat. No. 8,582,990.

(30) Foreign Application Priority Data

Jun. 5, 2009   (JP) ................................. 2009-136372
Jun. 30, 2009  (JP) ................................. 2009-155309

(51) Int. Cl.
*G03G 15/00*  (2006.01)
*B41J 2/47*   (2006.01)
*H04N 5/225*  (2006.01)
*B41J 11/00*  (2006.01)

(52) U.S. Cl.
CPC  *B41J 2/47* (2013.01); *B41J 11/009* (2013.01); *G03G 15/5029* (2013.01); *H04N 5/2256* (2013.01); *G03G 2215/00616* (2013.01); *G03G 2215/00751* (2013.01)

(58) Field of Classification Search
CPC ..... G03G 13/16; G03G 13/283; G03G 13/32; G03G 15/5029; G03G 16/00; G03G 2215/00616; G03G 2215/00751
See application file for complete search history.

(56) References Cited

U.S. PATENT DOCUMENTS

| | | | |
|---|---|---|---|
| 4,931,827 A | 6/1990 | Yoshino | |
| 2003/0202214 A1 | 10/2003 | Akita et al. | |
| 2004/0008244 A1 | 1/2004 | Tsujimoto | |
| 2008/0240750 A1 | 10/2008 | Hanamoto et al. | |
| 2008/0292360 A1 | 11/2008 | Hirai | |
| 2010/0310264 A1* | 12/2010 | Ishida et al. | 399/45 |

FOREIGN PATENT DOCUMENTS

| | | |
|---|---|---|
| CN | 1453657 A | 11/2003 |
| CN | 1479179 A | 3/2004 |

(Continued)

*Primary Examiner* — Roy Y Yi
(74) *Attorney, Agent, or Firm* — Canon U.S.A., Inc. IP Division

(57) ABSTRACT

An effective image area can be properly corrected in accordance with the quantity of light from an irradiation unit by selecting, as the effective image area, pixels having light quantities more than or equal to a threshold value that allows accurate acquisition of a surface image of a recording medium, on the basis of a light quantity distribution of the light from the irradiation unit. This reduces the influence of mounting accuracy of the irradiation unit, and allows the recording medium to be identified accurately.

50 Claims, 35 Drawing Sheets

(56) References Cited

FOREIGN PATENT DOCUMENTS

| | | |
|---|---|---|
| CN | 1808305 A | 7/2006 |
| CN | 101008809 A | 8/2007 |
| CN | 101266435 A | 9/2008 |
| JP | 2002-255397 A | 9/2002 |
| JP | 2004-038879 A | 2/2004 |
| JP | 2005-169718 A | 6/2005 |
| JP | 2006-162963 A | 6/2006 |
| JP | 2008-032848 A | 2/2008 |
| JP | 2008-103914 A | 5/2008 |
| JP | 2008-287145 A | 11/2008 |

* cited by examiner

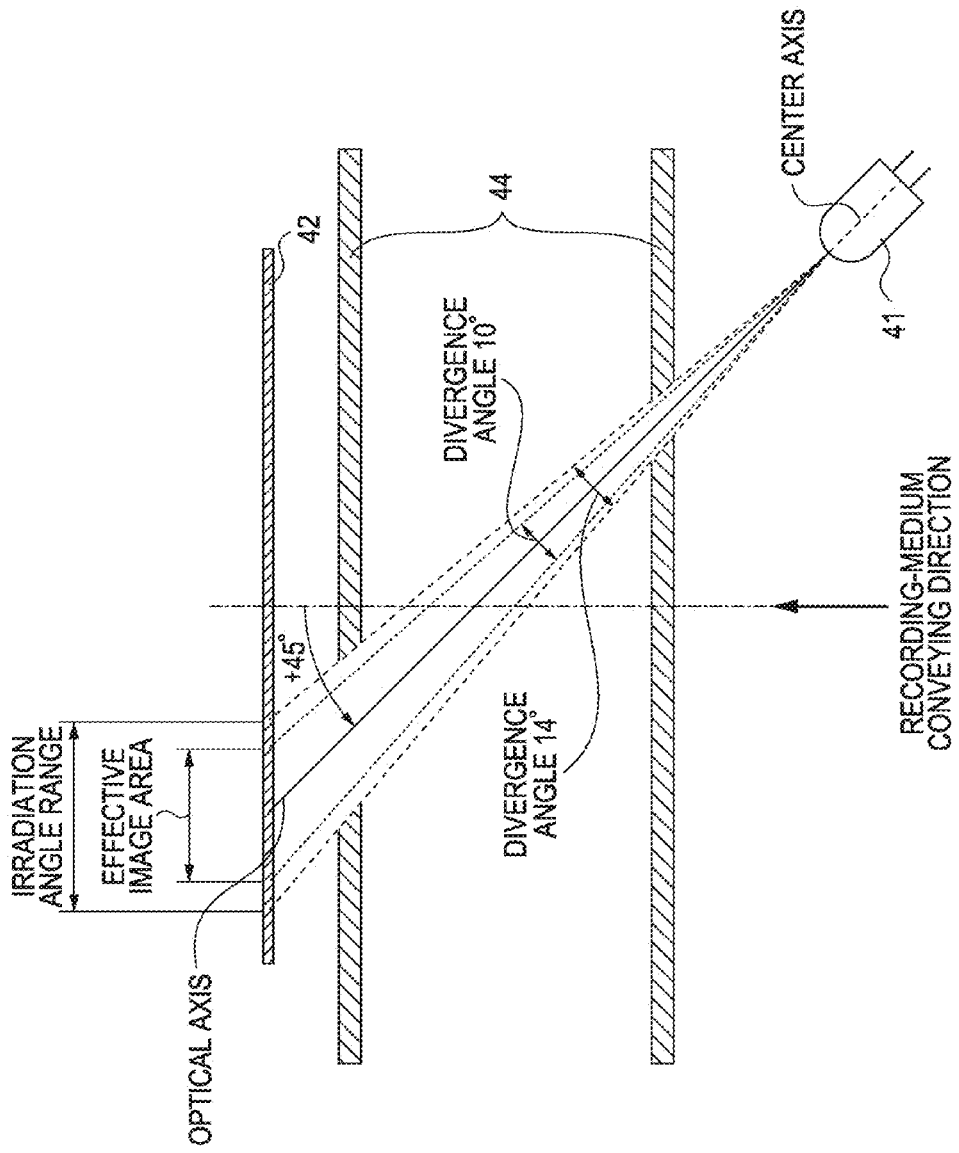

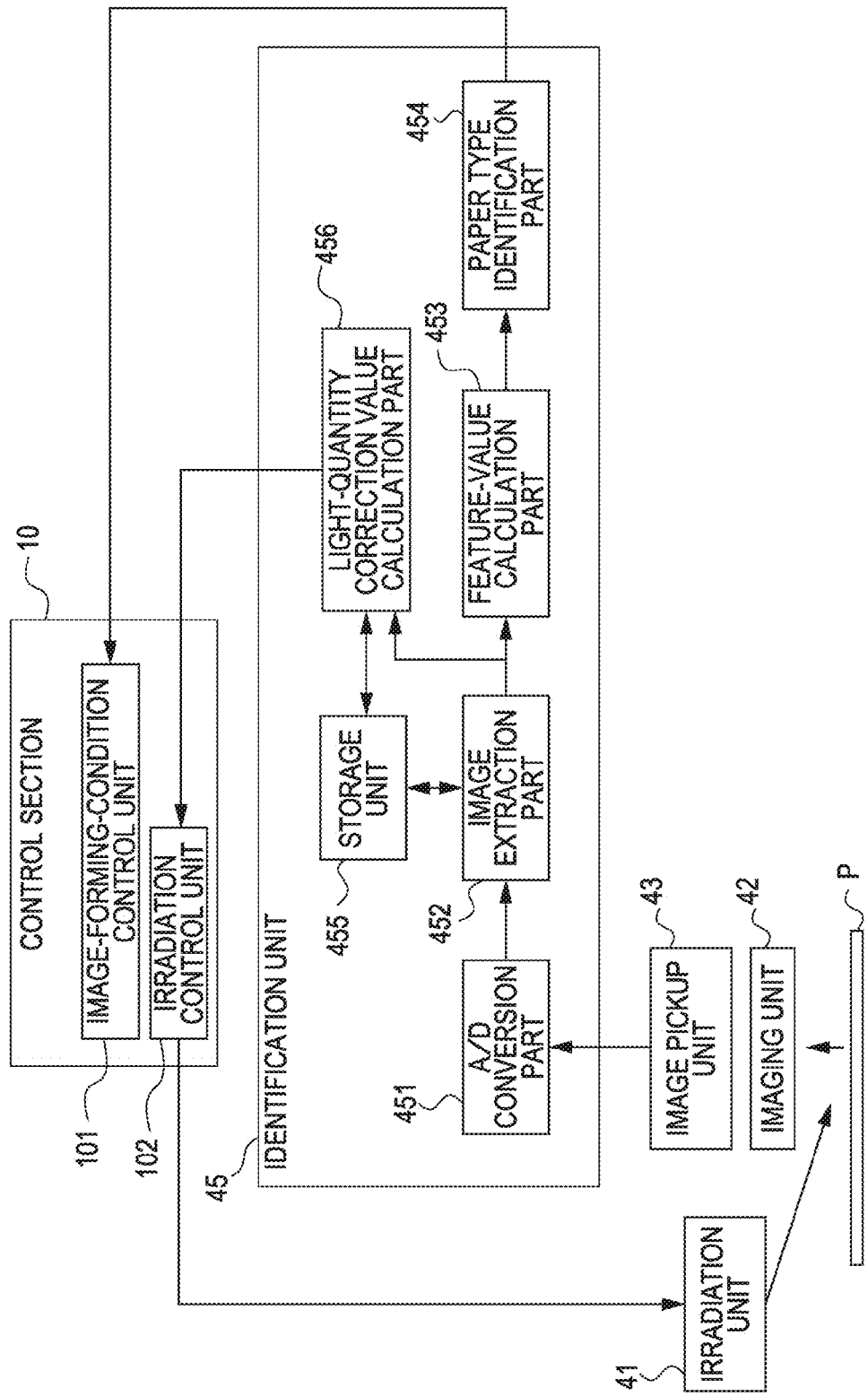

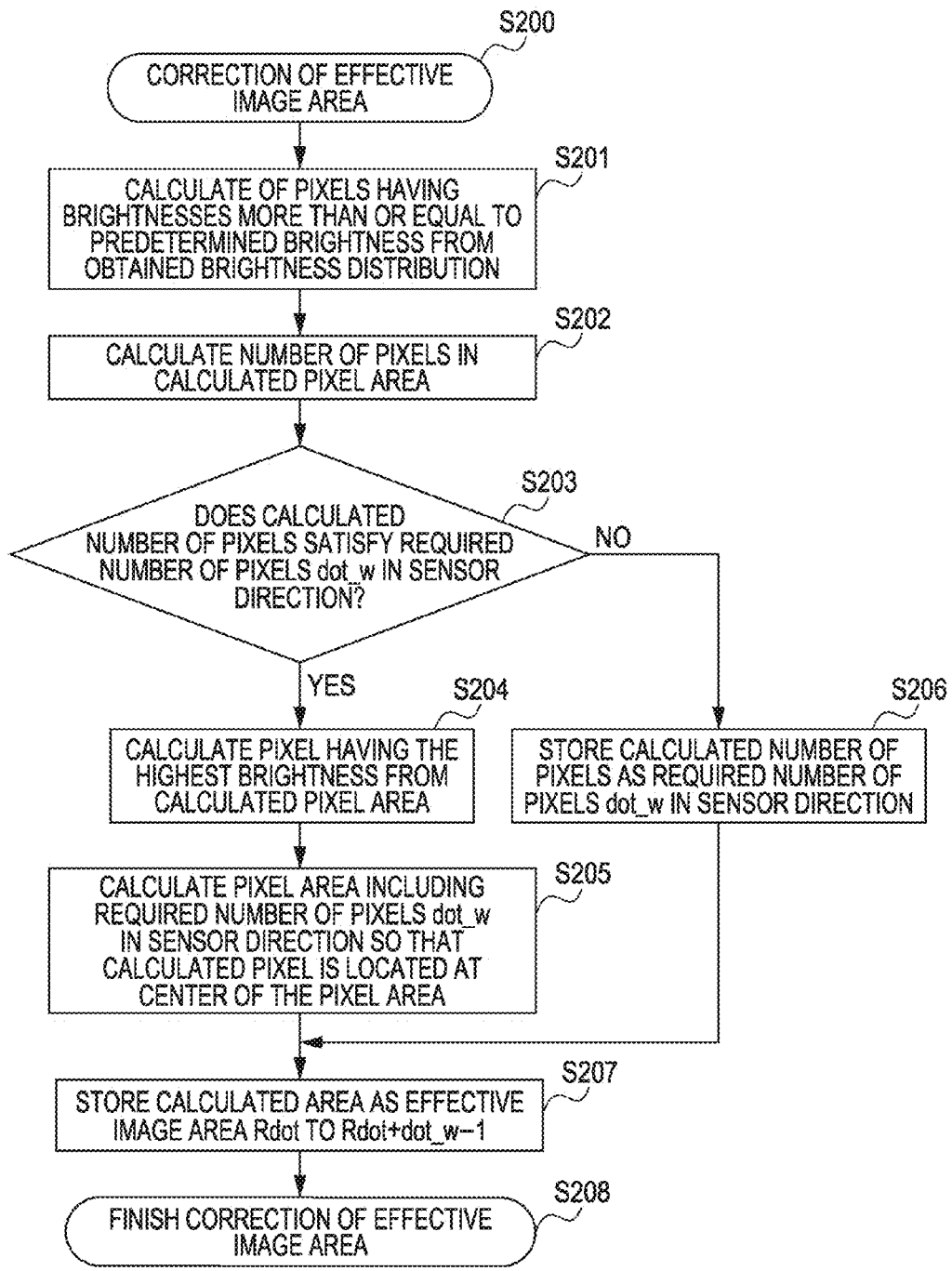

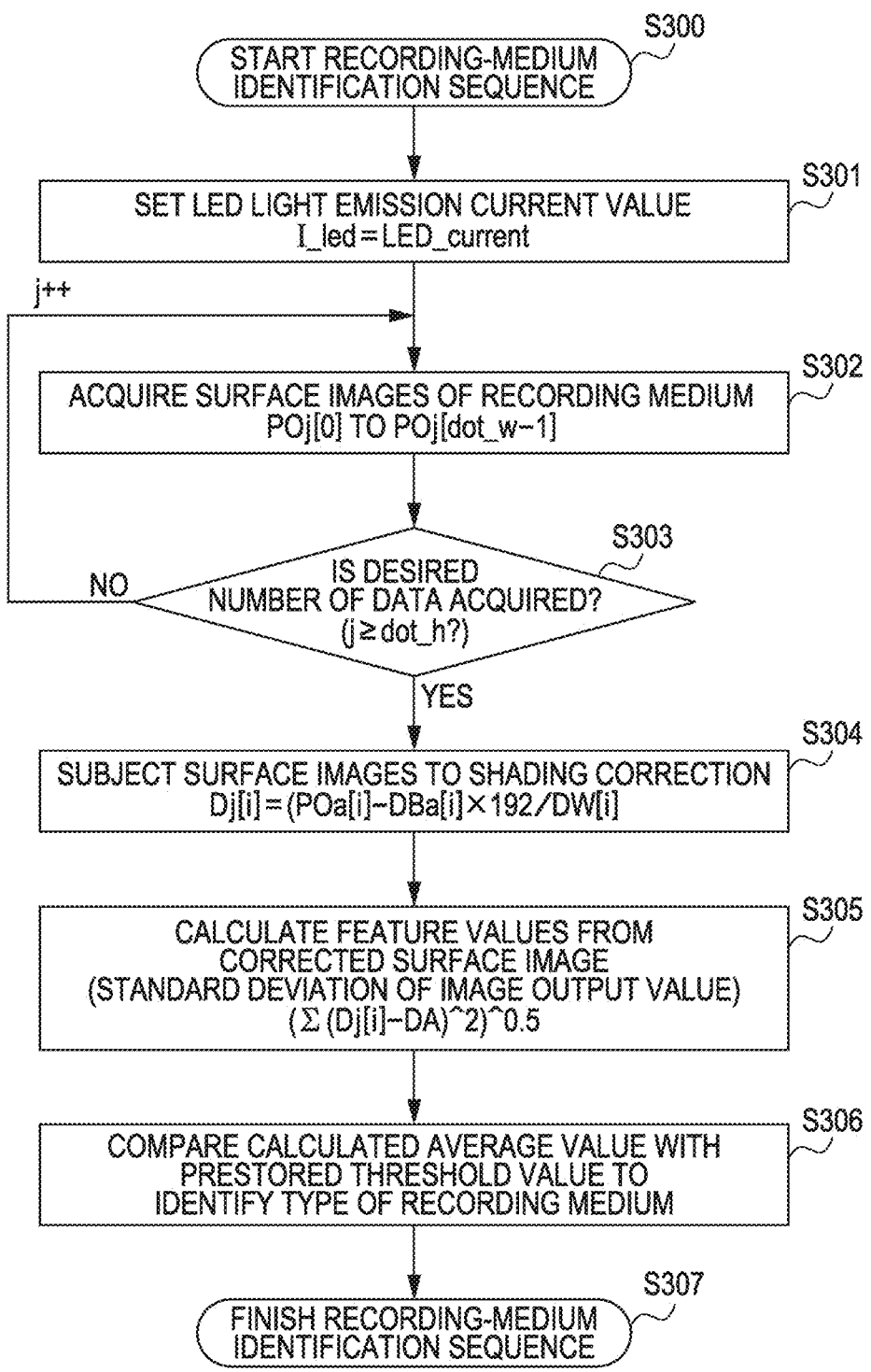

FIG. 21A
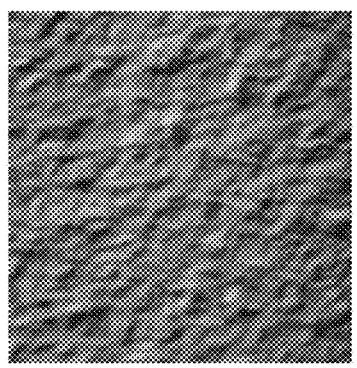 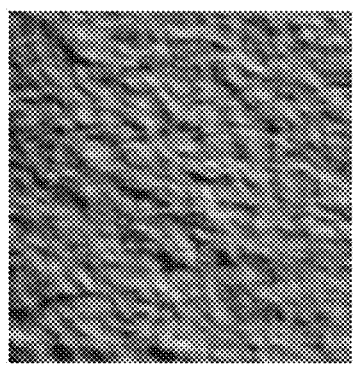
IMAGE OF EFFECTIVE         IMAGE OF EFFECTIVE
   IMAGE AREA a                IMAGE AREA b
FIG. 21B
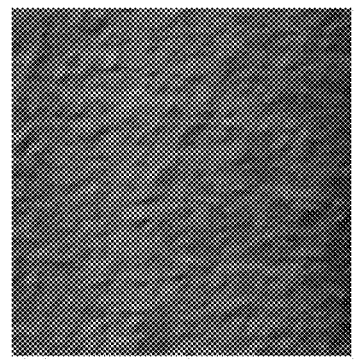 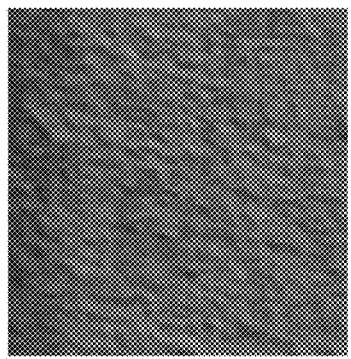
IMAGE OF EFFECTIVE         IMAGE OF EFFECTIVE
   IMAGE AREA a                IMAGE AREA b

FIG. 22A
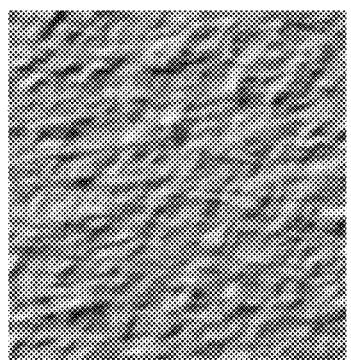 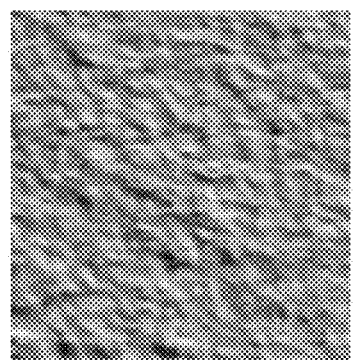
IMAGE OF EFFECTIVE IMAGE AREA a    IMAGE OF EFFECTIVE IMAGE AREA b
FIG. 22B
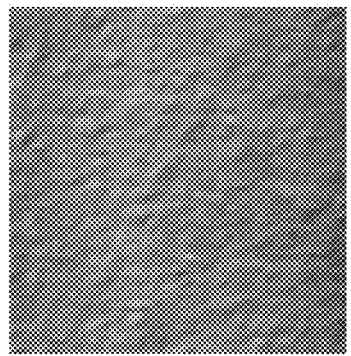 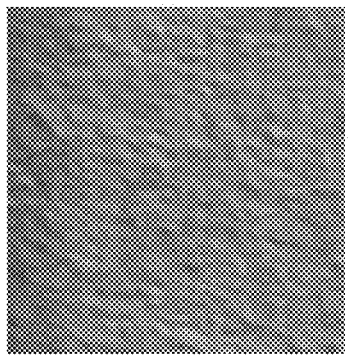
IMAGE OF EFFECTIVE IMAGE AREA a    IMAGE OF EFFECTIVE IMAGE AREA b

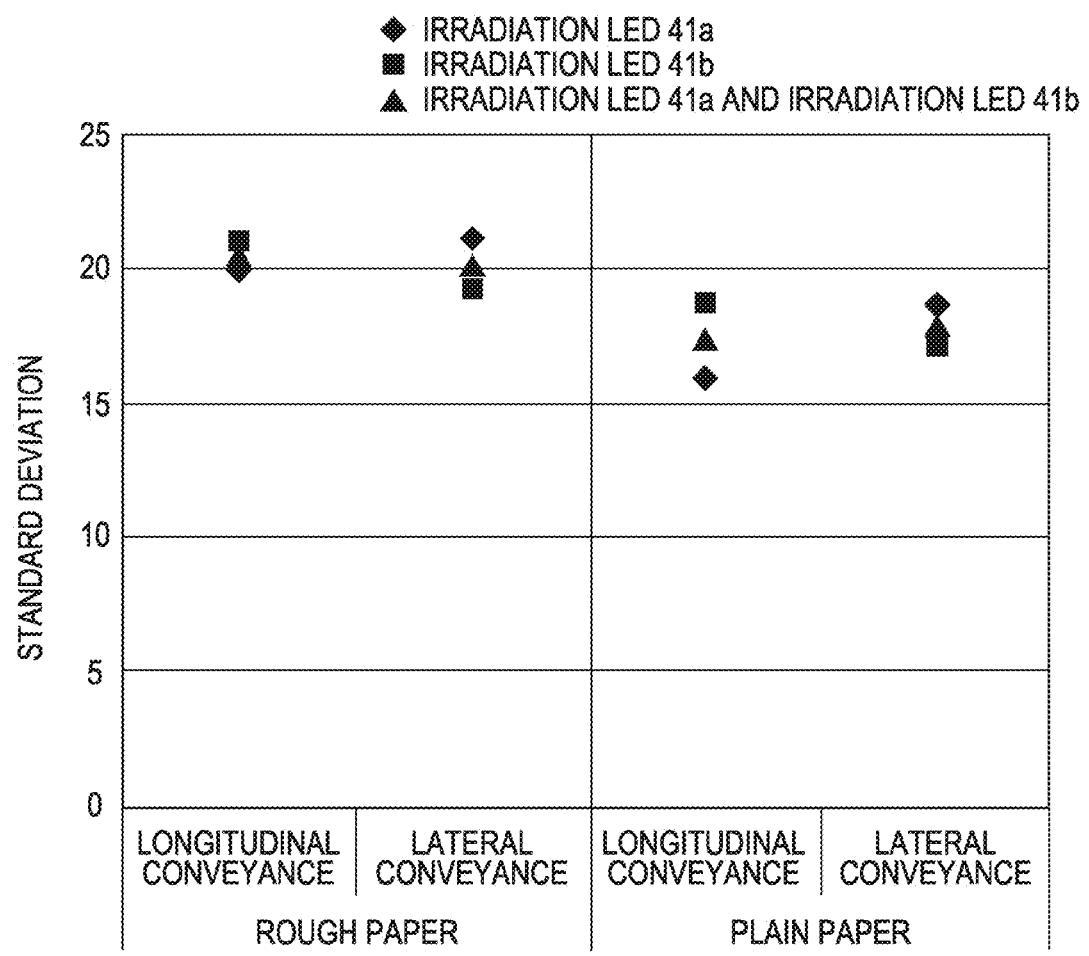

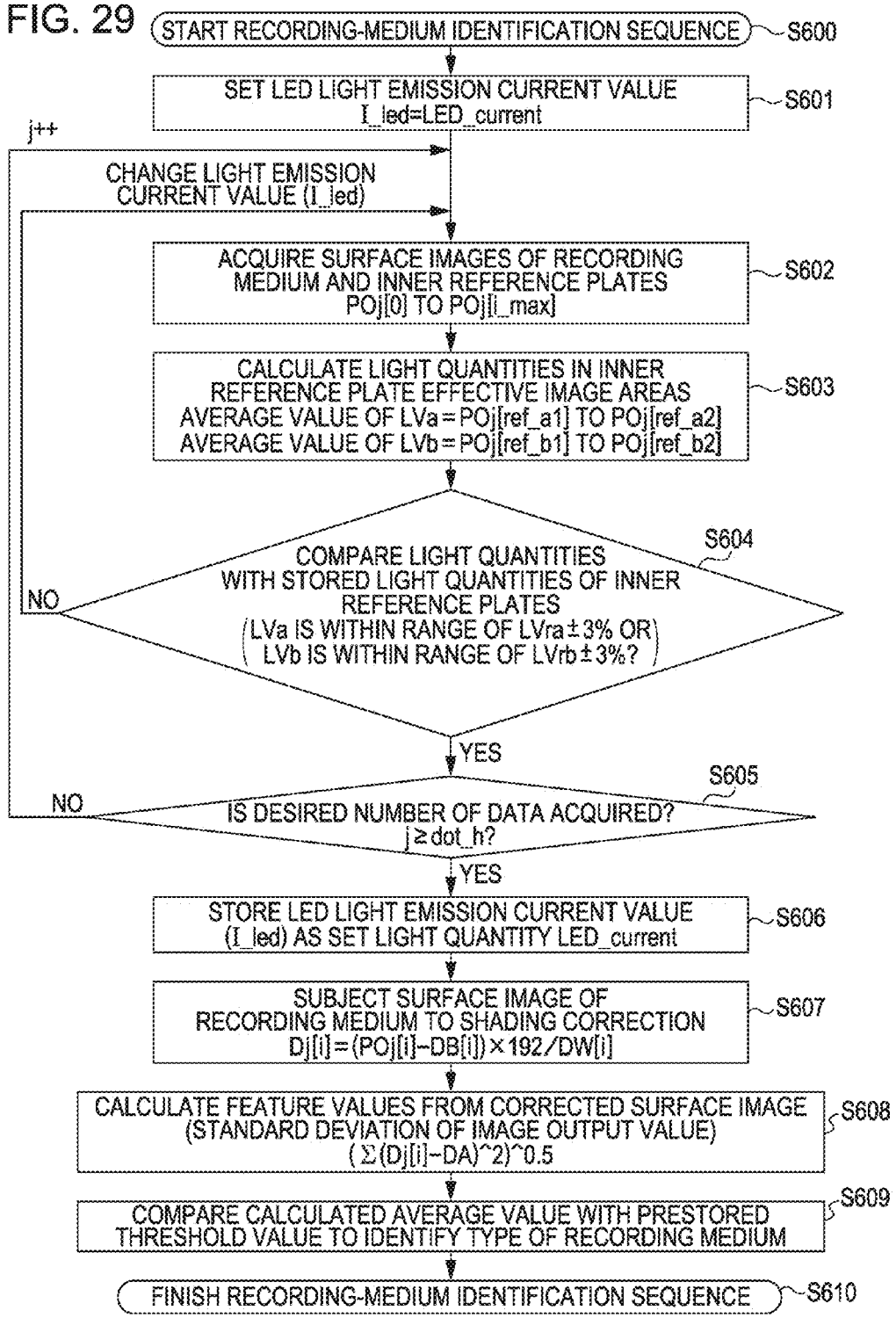

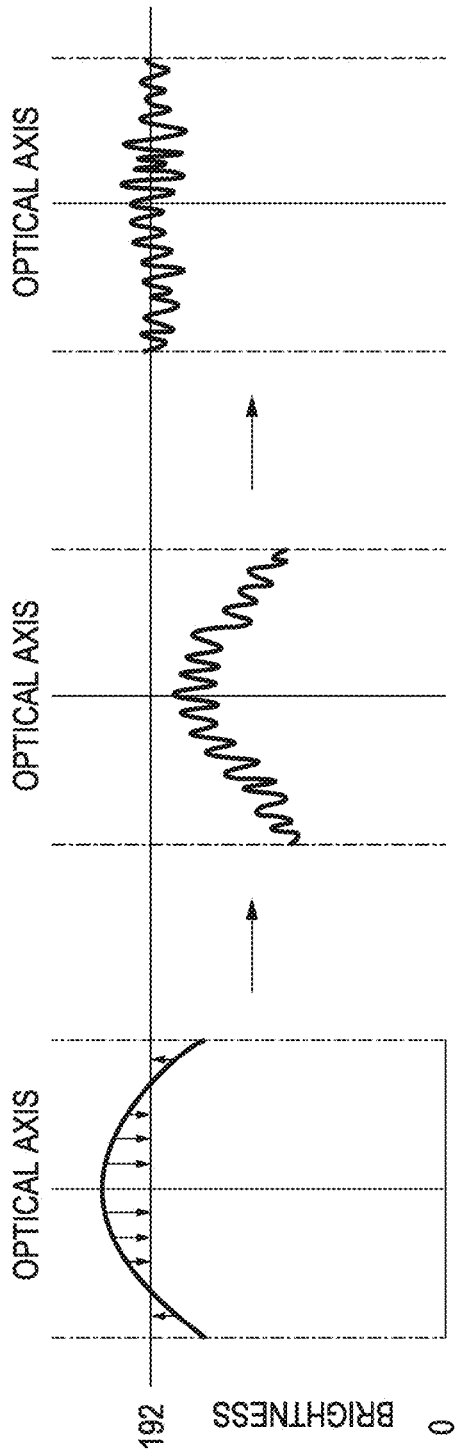

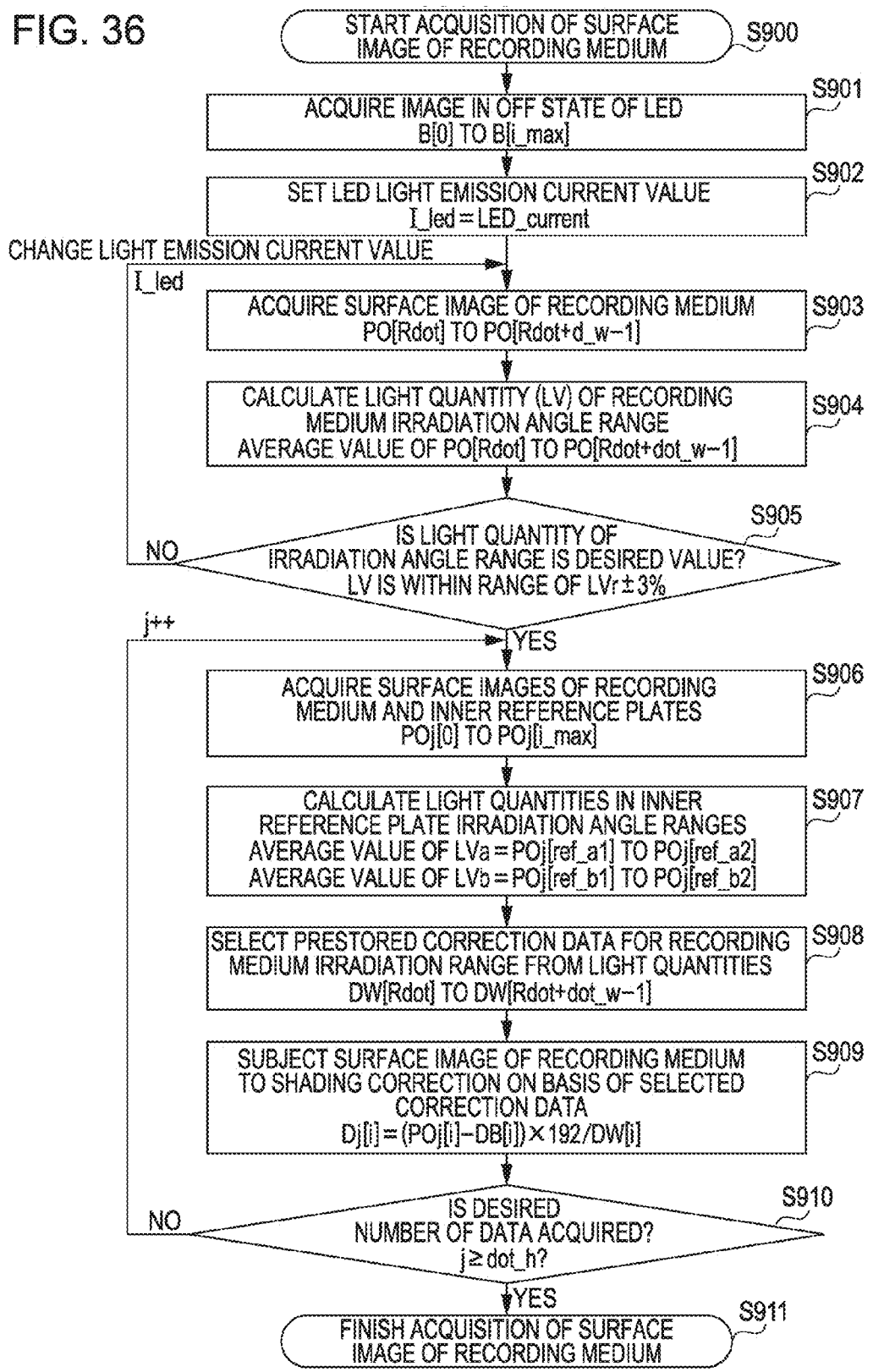

RECORDING-MEDIUM IMAGING DEVICE AND IMAGE FORMING APPARATUS

This application is a continuation application of application Ser. No. 13/887,122, filed on May 3, 2013, which is a divisional application of application Ser. No. 12/793,559, filed on Jun. 3, 2010, which claims the benefit of Japanese Patent Application No. 2009-136372 filed Jun. 5, 2009 and No. 2009-155309 filed Jun. 30, 2009, which are hereby incorporated by reference herein in their entirety.

BACKGROUND OF THE INVENTION

1. Field of the Invention

The present invention relates to an imaging device for forming an image of a recording medium, and an image forming apparatus.

2. Description of the Related Art

In an image forming apparatus of the related art, for example, the user sets the type (e.g., size or thickness) of a recording medium by the use of an external apparatus, such as a computer, or a control panel provided on a main body of the image forming apparatus. According to the setting, for example, transfer conditions (a transfer voltage and a conveying speed of the recording medium during transfer) and fixing conditions (a fixing temperature and a conveying speed of the recording medium during fixing) are controlled.

To reduce this user's burden of setting the type of the recording medium by the use of the computer or the control panel, there has been proposed an image forming apparatus that automatically identifies the type of a recording medium with a sensor or the like incorporated therein. This image forming apparatus equipped with the sensor or the like exerts control so that the type of the recording medium is automatically identified and conditions of transfer, fixing, etc. are set according to the identification result.

More specifically, Japanese Patent Laid-Open Nos. 2002-182518 and 2004-038879 propose that the type of a recording medium is identified by imaging a surface of the recording medium with a CMOS sensor and detecting the surface smoothness from an obtained image. When imaging is thus performed with the CMOS sensor, since shadows due to surface irregularities are directly imaged, the recording medium can be identified accurately. An accuracy is high particularly when identifying the type of a recording medium in which the presence, size, and depth of surface irregularities can be visually and clearly recognized, for example, when distinguishing between coated paper and non-coated paper.

In the above-described related art, the accuracy in identifying the recording medium can be increased by enlarging an imaging area of the recording medium. For example, the imaging area of the recording medium is enlarged by acquiring a surface image of the recording medium with a line sensor, which includes CMOS sensors serving as imaging devices arranged in line, while conveying the recording medium.

In this method, since the imaging area is large with respect to a light source, when the surface of the recording medium is imaged, an image area with an insufficient light quantity is formed by the influence of variations in the quantity of light emitted from the light source. If the type of the recording medium is identified by using this image area having an insufficient light quantity, the identification accuracy sometimes decreases.

SUMMARY OF THE INVENTION

The present invention identifies the type of a recording medium on the basis of an acquired surface image of the recording image while suppressing a decrease in identification accuracy for the recording medium resulting from variations in quantity of light emitted from a light source.

According to an aspect of the present invention, a recording-medium imaging device includes an irradiation unit configured to apply light onto a recording medium that is being conveyed; an image pickup unit including a plurality of pixels configured to receive the light applied by the irradiation unit and reflected by the recording medium, the image pickup unit imaging the reflected light as a surface image of the recording medium; and a control unit configured to detect a brightness distribution of the light received by the pixels of the image pickup unit from the surface image and to select, as an effective image area, an area having a brightness more than or equal to a threshold value from the brightness distribution.

Further features of the present invention will become apparent from the following description of exemplary embodiments with reference to the attached drawings.

BRIEF DESCRIPTION OF THE DRAWINGS

FIG. 3 is a sectional top view illustrating the configuration of the recording-medium imaging device of the first and second embodiments.

FIG. 4 is a block diagram illustrating the control in the recording-medium imaging device of the present invention.

FIG. 9 is a flowchart showing a procedure for correcting an effective image area in the recording-medium imaging device of the first embodiment.

FIG. 11 is a flowchart showing a procedure for identifying the type of a recording medium in the recording-medium imaging device of the first embodiment.

FIGS. 21A and 21B show images obtained by extracting effective image areas from the surface images shown in FIGS. 20A and 20B.

FIGS. 22A and 22B show images obtained by conducting shading correction on the images shown in FIGS. 21A and 21B.

FIG. 23 shows calculated feature values of the images subjected to shading correction in the recording-medium imaging device of the third embodiment.

FIG. 29 is a flowchart showing a procedure for identifying the type of a recording medium in the recording-medium imaging device of the fourth embodiment.

FIGS. 30A to 30C show changes in brightness made by shading correction in the fourth embodiment.

FIG. 36 is a flowchart showing a control procedure for acquisition of a surface image in a recording-medium imaging device according to a sixth embodiment.

DESCRIPTION OF THE EMBODIMENTS

Embodiments of the present invention will be described below with reference to the drawings. It should be noted that the following embodiments are not deemed to limit the invention claimed in the claims and that all combinations of features adopted in the embodiments are not always essential to the solving means of the invention.

First Embodiment

Figure 1:
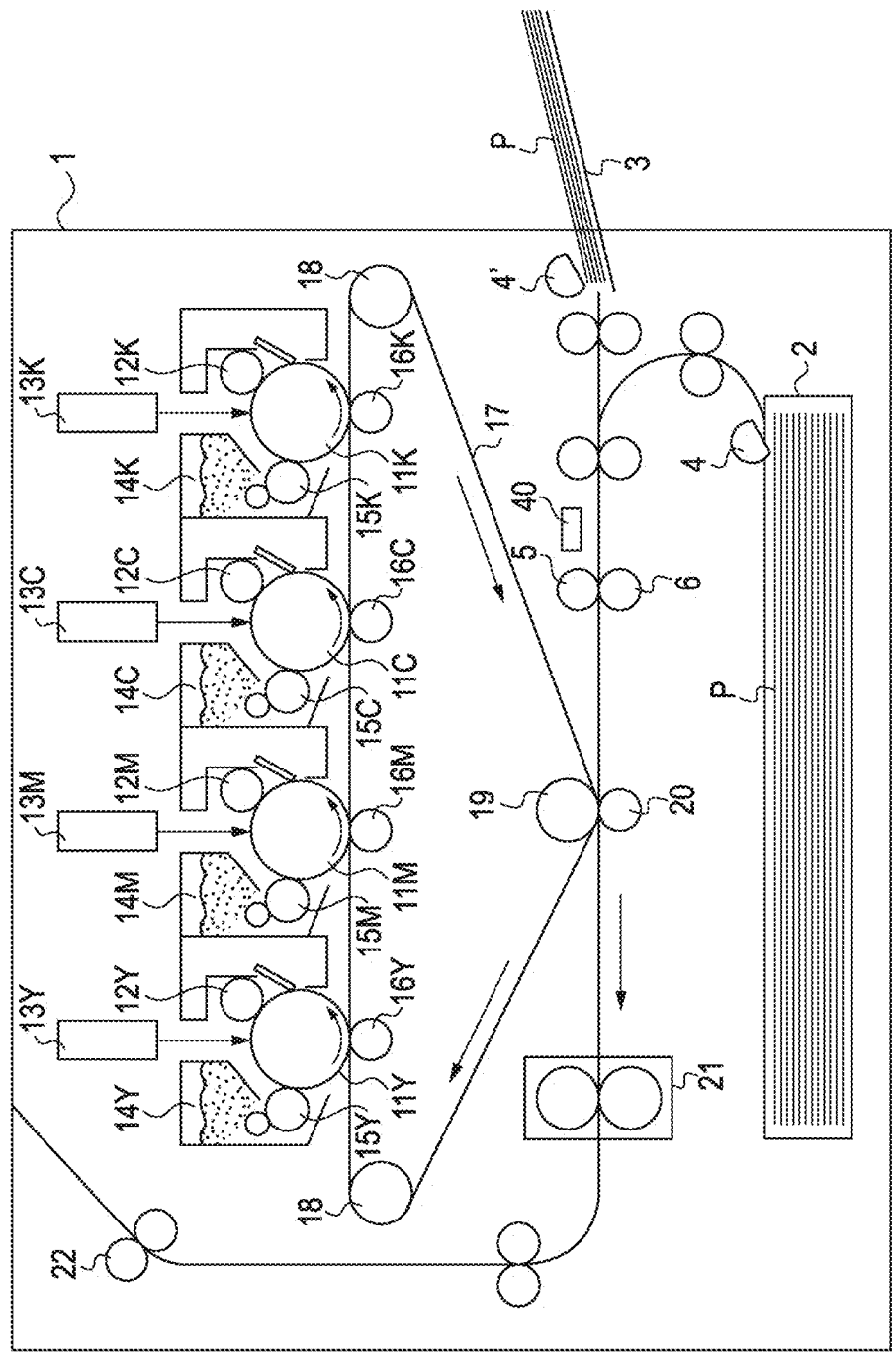
FIG. 1 is a schematic view illustrating a configuration of a color image forming apparatus according to the present invention.

A recording-medium imaging device according to a first embodiment can be used in, for example, a copying machine or an image forming apparatus. FIG. 1 illustrates a configuration of a color image forming apparatus which is equipped with a recording-medium imaging device. In the color image forming apparatus, an intermediate transfer belt is adopted, and a plurality of image forming sections are arranged in parallel.

A color image forming apparatus 1 shown in FIG. 1 includes the following components: A sheet supply cassette 2 stores recording media P, and a sheet supply tray 3 also stores recording media P. A sheet supply roller 4 supplies a recording medium P from the sheet supply cassette 2, and a sheet supply roller 4' supplies a recording medium P from the sheet supply tray 3. A conveying roller 5 conveys a supplied recording medium P, and a conveying opposing roller 6 opposes the conveying roller 5. Photosensitive drums 11Y, 11M, 11C, and 11K bear yellow, magenta, cyan, and black developing agents, respectively. Charging rollers 12Y, 12M, 12C, and 12K serve as primary charging members for uniformly charging the photosensitive drums 11Y, 11M, 11C, and 11K at a predetermined potential. Optical units 13Y, 13M, 13C, and 13K form electrostatic latent images by irradiating the photosensitive drums 11Y, 11M, 11C, and 11K charged by the charging rollers 12Y, 12M, 12C, and 12K with laser light beams corresponding to color image data.

Developing devices 14Y, 14M, 14C, and 14K develop electrostatic latent images formed on the photosensitive drums 11Y, 11M, 11C, and 11K into visible images. Developing-agent conveying rollers 15Y, 15M, 15C, and 15K respectively feed out developing agents in the developing devices 14Y, 14M, 14C, and 14K onto the photosensitive drums 11Y, 11M, 11C, and 11K. Primary transfer rollers 16Y, 16M, 16C, and 16K for the colors primarily transfer the images formed on the photosensitive drums 11Y, 11M, 11C, and 11K. An intermediate transfer belt 17 bears the primarily transferred images. The intermediate transfer belt 17 is driven by a driving roller 18. A secondary transfer roller 19 transfers the image on the intermediate transfer belt 17 onto the recording medium P, and a secondary transfer opposing roller 20 opposes the secondary transfer roller 19. A fixing unit 21 melts and fixes the developed image transferred on the recording medium P while conveying the recording medium P. A paper output roller 22 outputs the recording medium P that has been subjected to fixing by the fixing unit 21.

The photosensitive drums 11Y, 11M, 11C, and 11K, the charging rollers 12Y, 12M, 12C, and 12K, the developing devices 14Y, 14M, 14C, and 14K, and the developing-agent conveying rollers 15Y, 15M, 15C, and 15K are respectively combined in correspondence with the colors. Such a combination of a photosensitive drum, a charging roller, and a developing device is referred to as a cartridge. Cartridges corresponding to the colors are easily attached to and detached from the color image forming apparatus 1.

First, a description will be given of a paper conveying operation in image formation of the color image forming apparatus 1. Print data including a print command, image information, etc. is input from a host computer (not shown) to the color image forming apparatus 1. Then, the color image forming apparatus 1 starts a printing operation, and a recording medium P is supplied from the sheet supply cassette 2 or the sheet supply tray 3 into a conveying path by the sheet supply roller 4 or the sheet supply roller 4'. To synchronize formation of an image on the intermediate transfer belt 17 and conveyance, the recording medium P is temporarily stopped at the conveying roller 5 and the conveying opposing roller 6, and stands by until image formation starts. After that, the recording medium P is conveyed to a secondary transfer section in synchronization with image formation. A developed image is transferred from the intermediate transfer belt 17 onto the recording medium P by the secondary transfer roller 19 and the secondary transfer opposing roller 20. The developed image transferred on the recording medium P is fixed by the fixing unit 21 including a fixing roller and so on. After fixing, the recording medium P is output into an output tray (not shown) by the paper output roller 22, and the image forming operation is finished.

Next, an image forming method using electrophotography will be described. To form an image on the intermediate transfer belt 17, first, when print data is input from the host computer into the color image forming apparatus 1, the photosensitive drums 11Y, 11M, 11C, and 11K are uniformly charged at a fixed potential by the charging rollers 12Y, 12M, 12C, and 12K, respectively. According to the input print data, the optical units 13Y, 13M, 13C, and 13K form electrostatic images by scanning laser beams over the charged surfaces of the photosensitive drums 11Y, 11M, 11C, and 11K. The electrostatic latent images formed on the surfaces of the photosensitive drums 11Y, 11M, 11C, and 11K are developed into color visible images by the developing devices 14Y, 14M, 14C, and 14K and the developing-agent conveying rollers 15Y, 15M, 15C, and 15K. The photosensitive drums 11Y, 11M, 11C, and 11K are in contact with the intermediate transfer belt 17, and rotate in synchronization with rotation of the intermediate transfer belt 17. The developed images are sequentially superimposed onto the intermediate transfer belt 17 by the primary transfer rollers 16Y, 16M, 16C, and 16K so as to form a multicolor developed image. The multicolor developed image is secondarily transferred onto the recording medium P by the secondary transfer roller 19 and the secondary-transfer opposing roller 20.

In the color image forming apparatus 1 shown in FIG. 1, a recording-medium imaging device 40 is installed on an upstream side of the conveying roller 5 and the conveying opposing roller 6 (near the sheet supply cassette 2 or the sheet supply tray 3), and detects information about a surface image of the recording medium P conveyed from the sheet supply cassette 2 or the sheet supply tray 3. The recording-medium imaging device 40 performs identification during a time period from when the recording medium P is supplied from the sheet supply cassette 2 or the sheet supply tray 3 into the color image forming apparatus 1 to when the recording medium P is stopped while being nipped between the conveying roller 5 and the conveying opposing roller 6 or to when the recording medium P is conveyed to a secondary transfer nip defined by the secondary transfer roller 19 and the secondary transfer opposing roller 20. The recording-medium imaging device 40 can be installed at an arbitrary position upstream of the conveying roller 5 and the conveying opposing roller 6 as long as it can identify the type of the recording medium P at the position. Alternatively, the recording-medium imaging device 40 may be installed between the conveying roller 5 and the conveying opposing roller 6, and the secondary transfer nip.

Figure 2A:
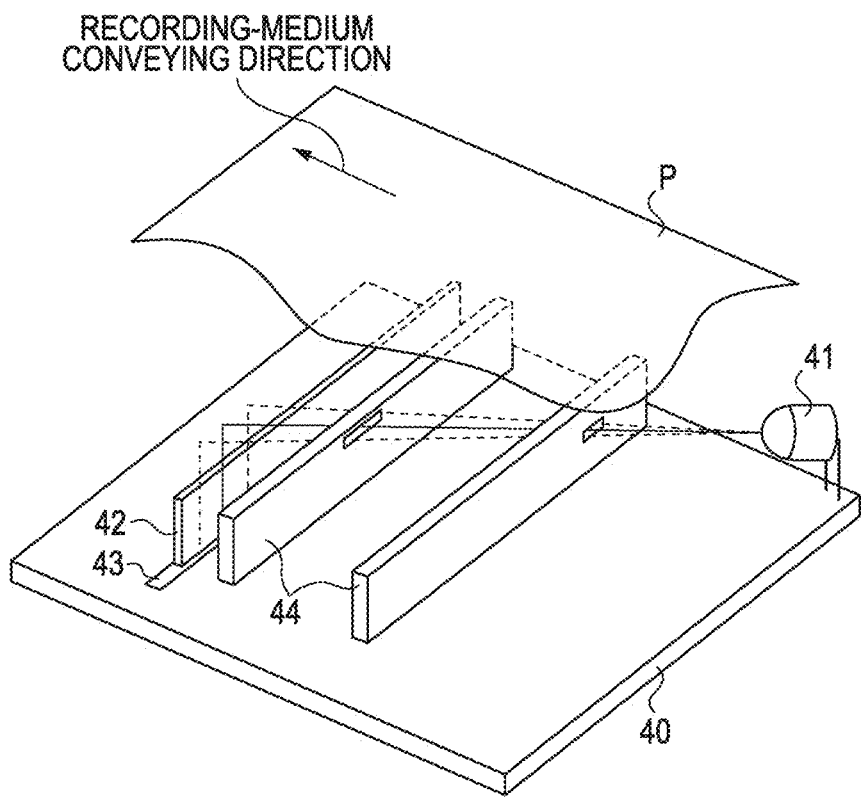
FIGS. 2A and 2B are a perspective view and a cross-sectional view, respectively, illustrating a configuration of a recording-medium imaging device according to first and second embodiments.
Figure 2B:
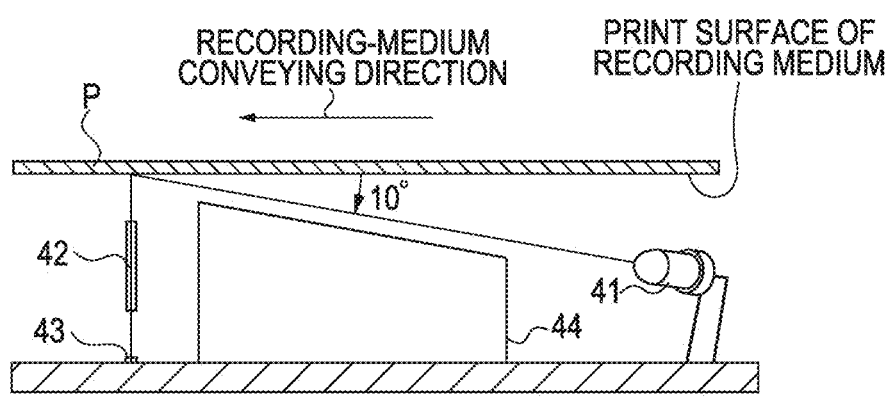

The recording-medium imaging device 40 of the first embodiment will now be described with reference to FIGS. 2 and 3. FIG. 2A shows a configuration of the recording-medium imaging device 40 for forming a surface image in which the surface smoothness is reflected. FIGS. 2B and 3 are a cross-sectional view and a sectional top view, respectively, of the recording-medium imaging device 40 shown in FIG. 2A.

The recording-medium imaging device 40 shown in FIG. 2A includes the following components: An irradiation LED 41 serves as an irradiation unit for irradiating a surface of a recording medium P with light. An imaging lens 42 serves as an imaging unit for receiving and imaging the irradiation light reflected from the surface of the recording medium P. A CMOS line sensor 43 serves as an image pickup unit for receiving the light image formed by the imaging unit. Slit structure members 44 guide the light emitted from the irradiation LED 41 in an arbitrary direction. Here, the term "arbitrary direction" will be described below with reference to FIG. 3.

The recording-medium imaging device 40 also includes, as a mechanism for conveying the recording medium P, a conveying guide (not shown) that forms a conveying path for the recording medium P in conjunction with the conveying roller 5 and the conveying opposing roller 6. While the irradiation LED 41 is formed by a bullet white LED in the first embodiment, it is not limited to the bullet white LED as long as it can irradiate the recording medium P with light. As shown in FIG. 2B, the imaging lens 42 is set orthogonal to the conveying direction of the recording medium P, and images the irradiation light reflected from the surface of the recording medium P. The image of the reflected light formed by the imaging lens 42 is picked up by the CMOS line sensor 43. In the first embodiment, light is emitted from the irradiation LED 41 at an irradiation angle of 10 degrees to the surface of the recording medium P. This angle is just exemplary, and the irradiation angle is not always limited to 10 degrees as long as it allows formation of a sufficient image for identification of the recording medium P.

Referring to FIG. 3, the irradiation LED 41 is located in a manner such that the optical axis of emitted light is shifted counterclockwise by 45 degrees (+45 degrees) from the conveying direction of the recording medium P. This angle corresponds to the arbitrary direction of the slit structure members 44 described above with reference to FIG. 2A. An irradiation angle range refers to a range on the recording medium P to be irradiated with the light emitted from the irradiation LED 41. The irradiation angle range corresponds to a pixel area of the CMOS line sensor 43 onto which light is applied from the irradiation LED 41 in the conveying direction of the recording medium P. In the irradiation angle range, a surface image of the recording medium P can be picked up. An effective image area is a part of the irradiation angle range used to identify the type of the recording medium P. Here, the optical axis is defined as light on the center axis of the irradiation LED 41. An ideal designed position of the LED 41 is such that the optical axis thereof is at the center of the irradiation angle range. In actuality, however, the irradiation LED 41 is sometimes not set at the center of the irradiation angle range, for example, because of the mounting accuracy.

In the first embodiment, as an example, the divergence angle of light emitted from the irradiation LED 41 is set at 14 degrees, and the irradiation angle of the irradiation LED 41 is set within a range of +38 to +52 degrees. The effective image area is used to identify the type of the recording medium P. In the effective image area, the divergence angle of the light from the irradiation LED 41 is set at 10 degrees less than in the irradiation angle range, and the irradiation angle of the irradiation LED 41 is set within a range of +40 to +50 degrees. Instead of being based on the divergence angle from the light source as in the first embodiment, the effective image area may be determined on other bases as long as it is narrower than the irradiation angle range.

The slit structure members 44 are arranged in a manner such that the light from the irradiation LED 41 serving as the light source is applied onto the recording medium P at the above-described angle. By placing the slit structure members 44, the direction in which light is applied to the pixels of the CMOS line sensor 43 can be uniquely specified, and this allows calculation of the above-described optical axis. While the slit structure members 44 are used as members for guiding light in the first embodiment, for example, optical waveguide members may be used alternatively.

FIG. 4 is an operation control block diagram of the recording-medium imaging device 40. First, the irradiation LED 41 applies light onto the surface of a recording medium P, and reflected light including a surface image, in which surface smoothness of the recording medium P is reflected, is imaged on the CMOS line sensor 43 via the imaging lens 42. After the formed image is picked up by the CMOS line sensor 43, surface images of the recording medium P corresponding to the quantities of light reflected from portions of the formed image are output to an identification unit 45. Subsequently, the identification unit 45 converts the received surface images of the recording medium P from analog to digital by an A/D conversion part 451, and thereby obtains images on the same straight line orthogonal to the conveying direction of the recording medium P. In the first embodiment, the A/D conversion part 451 uses an 8-bit A/D conversion IC, and outputs values from 0 to 255.

In an image extraction part 452 and a storage unit 455, the received surface images of the recording medium P are connected in the conveying direction, so that two-dimensional image information is acquired. In the first embodiment, the conveying speed of the recording medium P is set at 80 mm/sec, and the resolution of the CMOS line sensor 43 is set at 600 dpi in one line (about 42 μm per dot). The image size is set at 118×118 dots, which corresponds to 5×5 mm of the recording medium P. The image size can be appropriately changed in accordance with restrictions such as the size and cost of the CMOS line sensor, variations in quantity of light from the light source, and the distance for which the recording medium P can be conveyed in the image forming apparatus. The image pickup timing of the CMOS line sensor 43 is calculated at 42 μm/(80 mm/sec), and images are picked up at intervals of about 530 μsec or more. This allows images in image pickup areas on the surface of the recording medium P to be picked up without overlapping.

A surface image to be used to identify the type of the recording medium P is extracted from the acquired two-dimensional image information on the basis of information stored in the storage unit 455 about the optical axis and the above-described effective image area. In this case, a light quantity distribution of the irradiation LED 41 is corrected (shading correction). After that, a feature-value calculation part 453 calculates a feature value from the extracted surface image. Finally, a paper-type identification part 454 identifies the type of the recording medium P on the basis of the feature value calculated by the feature-value calculation part 453.

An image-forming-condition control unit 101 in a control section 10 receives the identification result from the paper-type identification part 454, and controls image forming conditions of the image forming apparatus 1 on the basis of the identification result. The image forming conditions include the transfer voltage, the conveying speed of the recording medium P, the temperature of the fixing unit, etc. For example, when the recording medium P is identified as rough paper, it has a fixability of the developing agent less than that of plain paper, and therefore, control is exerted, that is, the time in which the recording medium P stays in the fixing unit 21 is increased by decreasing the conveying speed of the recording medium P or the fixing temperature is increased.

The storage unit 455 stores, for example, the current value for controlling light emission from the irradiation LED 41 before factory shipment, and the target light quantity necessary for light quantity correction that will be described below. The storage unit 455 also stores dark current data in an off state of the irradiation LED 41 and light quantity unevenness data in an on state that are used to correct a light quantity difference, which will be described below, in order to identify the type of the recording medium P. The storage unit 455 further stores the pixel area and light quantity of data corresponding to the output from an internal reference plate and the light quantity of data corresponding to the optical axis of the irradiation LED 41 in the light quantity unevenness data in the on state of the irradiation LED 41.

When correcting the light quantity of the irradiation LED 41, the surface image information orthogonal to the conveying direction, which is acquired by the image extraction part 452, is output to a light-quantity correction amount calculating unit part, and the light-quantity correction amount calculating part 456 calculates a correction amount for the light quantity of the irradiation LED 41 on the basis of the output information. The calculated correction amount is output to an irradiation control unit 102 so as to control light emission. The light quantity is corrected so as not to become excessive or insufficient. If the light quantity is excessive, the quantity of reflected light from the surface of the recording medium P increases, and the acquired surface image entirely becomes bright. This eliminates surface irregularities of the recording medium P. In contrast, if the light quantity is insufficient, the surface of the recording medium P entirely becomes dark, and this also eliminates the surface irregularities of the recording medium P. For this reason, correction needs to be made so that the irradiation LED 41 emits a quantity of light suitable for pickup of the surface image.

For extraction of the surface image and correction of the light quantity, the position of the optical axis of the irradiation LED 41 is important. As described above, when the irradiation LED 41 is set in the image forming apparatus, the optical axis thereof is sometimes not located at a desired designed position because of manufacturing variations. For this reason, the irradiation angle for the recording medium P and the light quantity distribution deviate from designed values, and an image area extracted in the predetermined effective image area sometimes includes a portion that is irradiated insufficiently. The relationship between the optical axis and light irradiation will be described below.

Figure 5A:
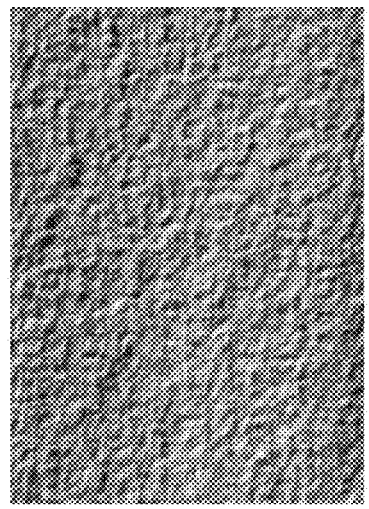
FIGS. 5A to 5D show surface images formed by the recording-medium imaging device of the first embodiment when the optical axis does not deviate and when the optical axis deviates, and images in effective image areas extracted from the surface images.
Figure 6A:
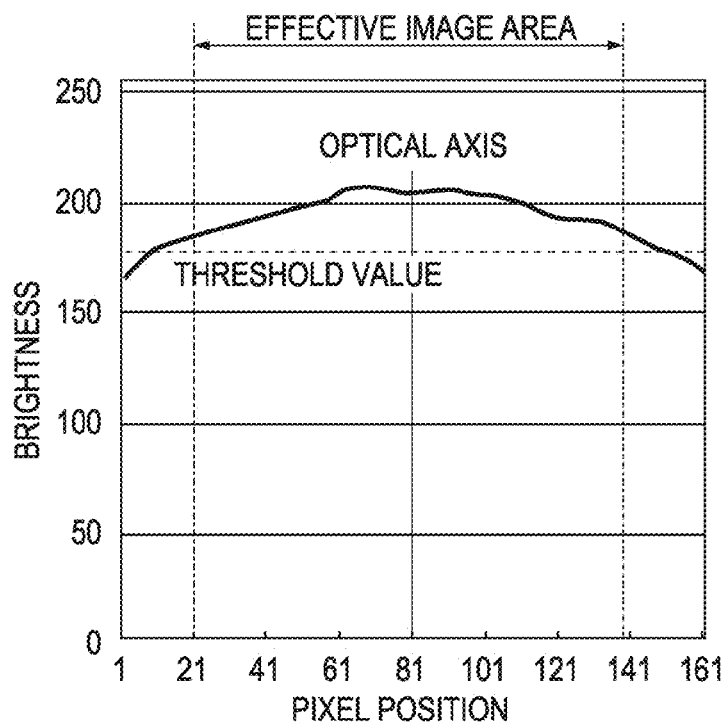
FIGS. 6A and 6B are brightness distribution charts of the recording-medium imaging device of the first embodiment, respectively, provided when the optical axis does not deviate and when the optical axis deviates.

FIG. 5A shows a surface image obtained when the optical axis of the irradiation LED 41 is located at the desired designed position without deviation. FIG. 6A shows outputs from a plurality of pixels in one line of the CMOS line sensor 43 obtained in this case, which indicate a light quantity distribution of the irradiation LED 41. While the desired designed position is set at a pixel position 81 in the first embodiment, it can be appropriately set in accordance with, for example, the setting positions of the slit structure members 44. As shown by the light quantity distribution in FIG. 6A, since the light quantity in the effective image area is larger than a threshold value that allows acquisition of an accurate image, an accurate surface image can be obtained. While this threshold value is set at 180 in the first embodiment, it can be appropriately determined as long as the type of the recording medium P can be identified normally.

Figure 5B:
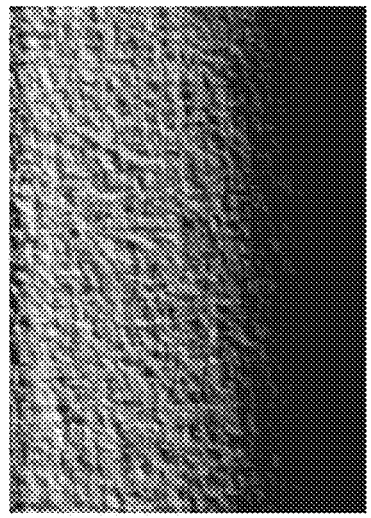
Figure 5C:
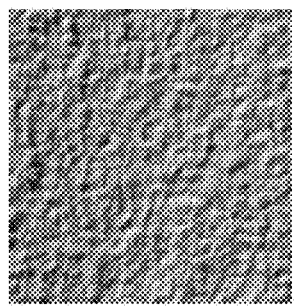
Figure 5D:
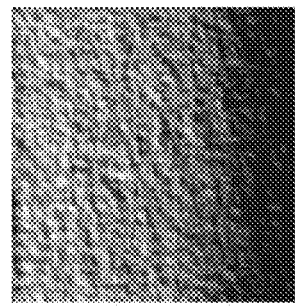
Figure 6B:
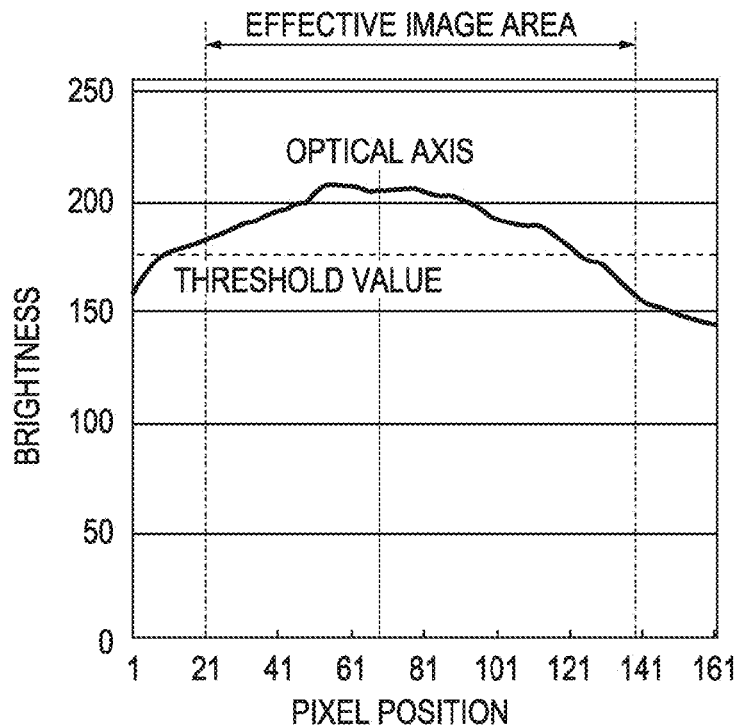
Figure 7A:
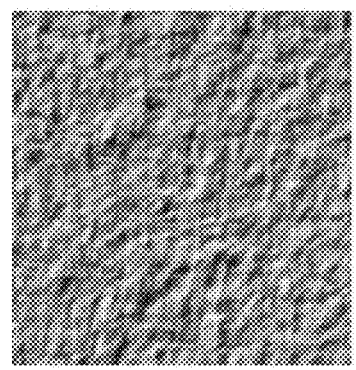
FIGS. 7A to 7D show images obtained by conducting shading correction on the extracted images of the effective image areas in FIG. 5, and histograms calculated from the images.
Figure 7B:
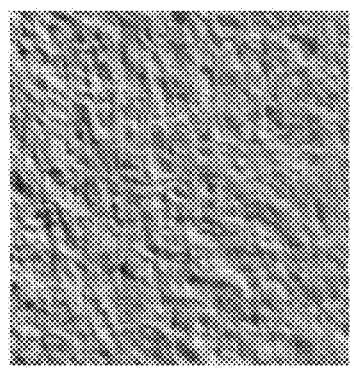

FIG. 5B shows a surface image obtained when the optical axis of the irradiation LED 41 is not located at the desired designed position. FIG. 6B shows outputs from the pixels in one line of the CMOS line sensor 43 obtained in this case, which indicate a light quantity distribution of the irradiation LED 41. As shown by the light quantity distribution in FIG. 6B, since the optical axis deviates from the desired designed position, dark image portions with an insufficient light quantity are included in the effective image area. For this reason, the accuracy of the surface image of the recording medium P shown in FIG. 5B is low. The light quantity distributions shown in FIGS. 6A and 6B serve as correction data used in below-described shading correction for correcting the light quantity difference of surface images. FIGS. 5C and 5D show surface images extracted from the surface images shown in FIGS. 5A and 5B on the basis of the effective image area necessary for identification of the type of the recording medium P. FIGS. 7A and 7B show results of shading correction conducted on the surface images shown in FIGS. 5C and 5D. Details of shading correction will be described below.

Figure 7C:
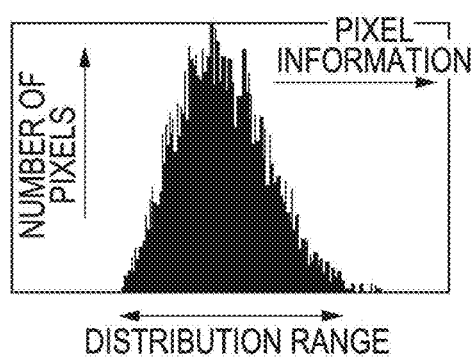
Figure 7D:
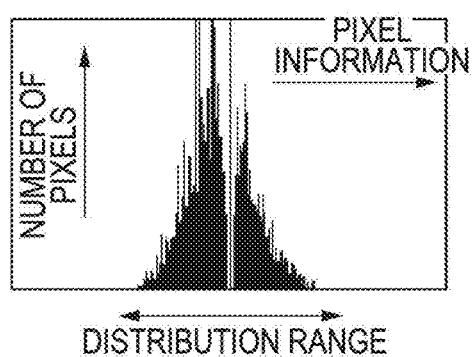

As shown in FIG. 7A, when the optical axis does not deviate from the desired designed position, a high-accuracy surface image in which surface irregularities are clearly exhibited is obtained. In contrast, when the optical axis deviates from the desired designed position, as shown in FIG. 7B, an insufficiently irradiated area is selected as an effective image area, and therefore, a low-accuracy surface image in which surface irregularities are difficult to read is obtained. FIGS. 7C and 7D are histograms displaying brightness distributions that are obtained from brightness information about the surface images shown in FIGS. 7A and 7B.

The histogram of the surface image shown in FIG. 7C obtained when the optical axis does not deviate from the desired designed position displays a regular distribution. In contrast, the histogram of the surface image shown in FIG. 7D obtained when the optical axis deviates from the desired designed position displays a distribution in which the brightness widely varies because of the influence of a right part of the image area shown in FIG. 7B (a dark part in FIG. 5D). In the case of this distribution, a recording medium having large surface irregularities may be erroneously identified as a recording medium having small surface irregularities. Conversely, a recording medium having small surface irregularities may be erroneously identified as a recording medium having large surface irregularities. In this case in which the surface image of the recording medium P includes a portion having a low brightness, erroneous identification may occur. Hence, a high-accuracy surface image can be obtained by selecting pixels having brightnesses more than or equal to a threshold value as an effective image area.

A method for controlling light quantity correction and a method for selection of an effective image area will now be described below. The following control method and selection method are carried out before factory shipment, and obtained data is stored in the storage unit 455. Light quantity correction is performed on the basis of surface information obtained in the irradiation angle range about a reference plate or a recording medium P serving as a reference. Further, light quantity correction and selection of the effective image area may be performed not only before factory shipment, but also when the reference recording medium P is conveyed by the user. Basically, light quantity correction and selection of the effective image area are performed before factory shipment, and the results of correction and selection are stored in the storage unit 455 so as to be used when actually identifying the recording medium P. While this data stored in the storage unit 455 is basically used after shipment, an appropriate light quantity and an appropriate effective image area may differ from those before factory shipment because of changes in conditions and circumstances, for example, degradation of the irradiation LED 41. In this case, light quantity correction and selection of the effective image area can be performed again with the reference plate or the reference paper.

Light quantity correction is performed for the following reason: If the light quantity is excessive, the quantity of light reflected from the surface of the recording medium P increases, and an obtained surface image becomes too bright entirely, so that surface irregularities are difficult to read. In contrast, if the light quantity is insufficient, the quantity of light reflected from the surface of the recording medium P decreases, and an obtained surface image becomes too dark entirely, so that surface irregularities are also difficult to read. For this reason, it is necessary to make correction such that the irradiation LED 41 emits a quantity of light suitable for pickup of the surface image. Further, as described above, it is necessary to properly select an effective image area in order to obtain an accurate surface image. The effective image area is properly selected to reduce the influence of mounting accuracy of the irradiation LED 41 on the surface image.

Figure 8:
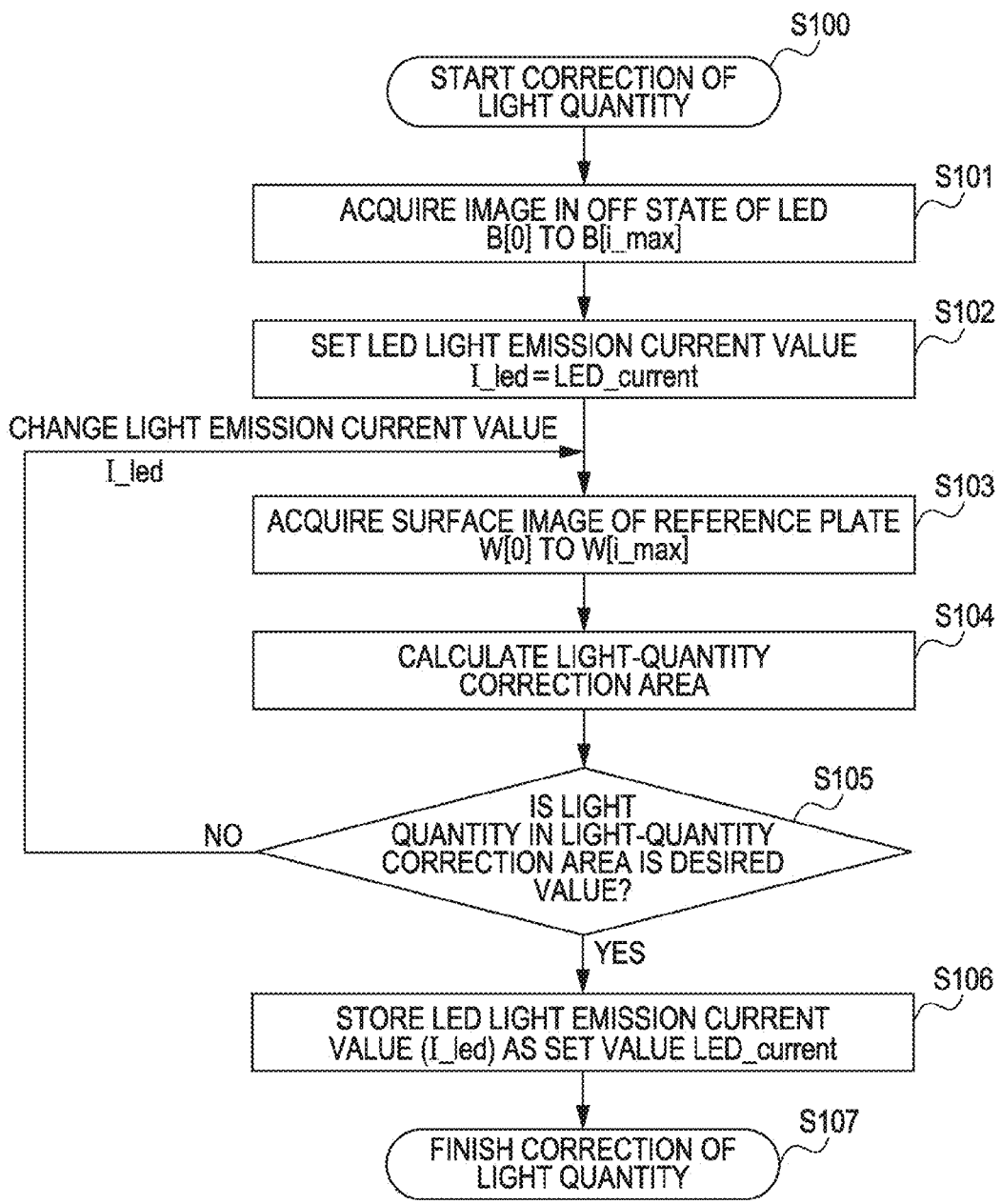
FIG. 8 is a flowchart showing a procedure for correcting the light quantity in the recording-medium imaging device of the first embodiment.

A method for controlling light quantity correction will be described with reference to a flowchart of FIG. 8. In Step S101, an image is acquired by the CMOS line sensor 43 in a state in which the irradiation LED 41 is off, and is output as dark current data B to an array B[0] to B[i_max] in the storage unit 455. This dark current data B is brightness information used to remove noise, such as ambient light, and serves as a black (dark portion) reference in shading correction that will be described below. The dark current data B is obtained by acquiring a plurality of images with the CMOS line sensor 43 and calculating an average value of brightnesses of each obtained pixel in the images. Since the CMOS line sensor 43 has a resolution of 600 dpi and uses 468 pixels in the first embodiment, dark reference data B can be found as (B1+B2+B3+B4+B5)/5 when i_max=468−1, the number of measurement operations is five, and outputs made in the measurement operations are designated as B1 to B5.

In Step S102, a light emission current value (hereinafter referred to as I_led) of the irradiation LED 41 is set, and light is emitted from the irradiation LED 41. As the value I_led, a value LED_current stored in the storage unit 455 is used. When light quantity correction has already been made once or more, since the value LED_current has already been set, the number of control operations in a loop defined by the following Steps S103 to S105 can be reduced. When light quantity control is started in an initial state, 0 or a predetermined default value is used as LED_current.

In Step S103, light is emitted from the irradiation LED 41, and a surface image is acquired by the CMOS line sensor 43. In this case, the light is applied onto a reference plate set in the irradiation angle range of the irradiation LED 41. Then, reflected light from the reference plate is received by the CMOS line sensor 43, and brightness information about the reference plate is acquired and is output to an array W[0] to W[i_max] of the storage unit 455. Here, "i_max" is the same as the above-described i_max=468−1. With this, brightness information for one line of the CMOS line sensor 43 is obtained. While the reference plate is used as an example here, it may be replaced with reference paper.

In Step S104, a pixel area to be corrected for light quantity is detected from the obtained surface information about the reference plate. In the first embodiment, a pixel T having the highest brightness is detected from the brightness distribution of one line. The pixel T and 30 pixels on each of the right and left sides of the pixel T define a light quantity correction area. The brightness distribution is not limited to one line, and it may be detected from average values of images for a plurality of lines.

In Step S105, an average brightness is calculated from the brightness distribution in the calculated light quantity correction area. In the first embodiment, the average brightness is calculated from W[T−30] to W[T+30]. The value I_led of the irradiation LED 41 is adjusted so that the calculated average brightness becomes a desired light quantity correction value. If it is determined by comparison that the average brightness is insufficient, the value I_led of the irradiation LED 41 is increased for adjustment. When the average brightness is adjusted to the desired value, light quantity correction is finished. If the calculated brightness does not change, it is determined that the light quantity of the irradiation LED 41 becomes the largest value, and light quantity correction is finished. In the first embodiment, the desired light quantity correction value to be obtained with the reference plate is set at 192 (the brightness includes 256 levels (0 (dark) to 255 (bright)) in consideration of the shortest image pickup time of the CMOS line sensor 43 and the irregular reflectance. The light quantity correction value is not limited to the above-described value, and may be appropriately set as long as it allows acquisition of an accurate surface image of the recording medium P.

In Step S106, the value I_led of the irradiation LED 41 is stored as LED_current. If there is no reference plate for light quantity correction, light is applied onto the recording medium P, and light emission from the irradiation LED 41 is controlled on the basis of surface information about the recording medium P so that the value I_led becomes a value stored in the storage unit 455. The above-described light quantity correction method is performed in a preparatory stage before a surface image of the recording medium P is acquired.

A method for calculating an effective image area will be described with reference to a flowchart of FIG. 9. In Step S201, pixels having brightnesses more than or equal to a predetermined threshold value are calculated from the brightness distribution obtained by light emission from the irradiation LED 41. In the first embodiment, the threshold value of brightness is set at 180 (the brightness includes 256 levels (0 (dark) to 255 (bright)) in consideration of the shortest image pickup time of the CMOS line sensor 43 and the irregular reflectance. In Step S202, the number of calculated pixels having brightnesses more than or equal to the threshold value is found to calculate an effective image area. This is because the effective image area is a continuous area including adjacent pixels and needs to be within the irradiation angle range.

In Step S203, it is determined whether or not the number of pixels in the calculated effective image area meets the required number of pixels dot_w in a direction (hereinafter referred to as a sensor direction) orthogonal to the prestored conveying direction used for identification. If so, the sequence proceeds to Step S204. If not so, the sequence proceeds to Step S206. When the above-condition is satisfied, the number of pixels in the image area is limited to the required number of pixels dot_w. A method of limitation will be described in conjunction with the following Steps S204 and S205. While the required number of pixels dot_w in the sensor direction is 118 in the first embodiment, it is not limited to this value as long as the recording medium P can be identified accurately. In Step S204, a pixel having the highest brightness in the calculated image area is calculated.

In Step S205, an image area is recalculated so that the calculated pixel having the highest brightness is located at the center of the image area. In this case, as described in conjunction with Step S203, the image area is calculated so that the number of pixels in the image area becomes equal to the required number of pixels dot_w in the sensor direction. In Step S206, the number of pixels in the calculated image area is stored as the required number of pixels dot_w in the sensor direction. This image area serves as an effective image area used for identification. In Step S207, the calculated image area is stored as an effective image area (W[Rdot]−W[Rdot+dot_w−1]).

Figure 10A:
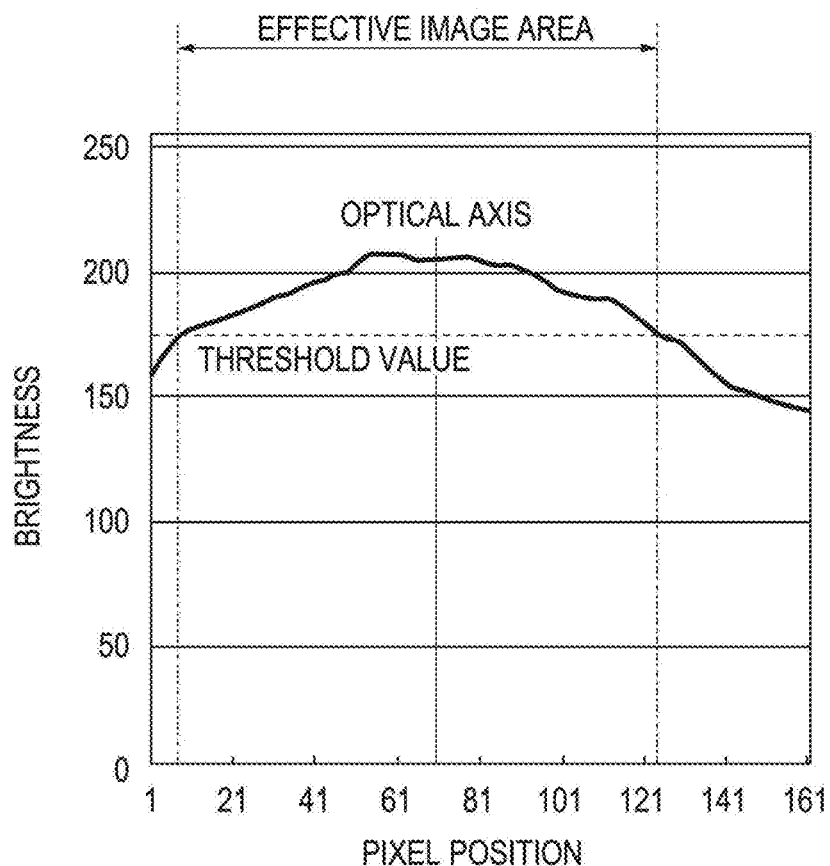
FIGS. 10A and 10B respectively show a brightness distribution of an effective image area corrected on the basis of the brightness distribution chart of FIG. 6, and a corrected surface image.
Figure 10B:
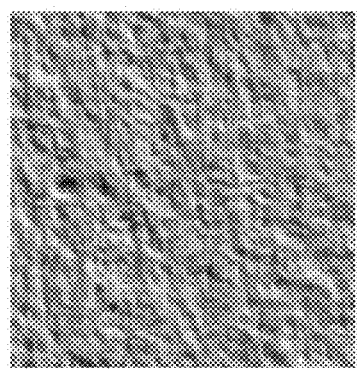

FIG. 10A shows output values from the pixels in one line of the CMOS line sensor 43 corrected for the effective image area. FIG. 10B shows a surface image of the recording medium P corrected for the effective image area. A light quantity distribution shown in FIG. 10A is similar to that shown in FIG. 6B. In the case shown in FIG. 6B, since the effective image area includes the portions having brightnesses lower than the threshold value, accuracy of the surface image is reduced. In contrast, in the light quantity distribution shown in FIG. 10A, the effective image area includes only pixels having brightnesses higher than or equal to the threshold value, and therefore, the output values in the effective image area are high. The surface image exhibits in FIG. 10B also has a high accuracy. This shows that the influence of mounting accuracy of the irradiation LED 41 on the surface image can be reduced.

A sequence for identifying the type of the recording medium P will be described with reference to a flowchart of FIG. 11. In Step S301, the irradiation LED 41 applies light onto the recording medium P according to the prestored LED light emission current value I_led.

In Step S302, reflected light from the recording medium P is imaged on the CMOS line sensor 43, and surface images in the effective image area of the recording medium P are output to the identification unit 45. Then, brightness information about the surface images of the recording medium P is stored in an array POj[0]−POj[dot_w−1] of the CMOS line sensor 43. The identification unit 45 acquires two-dimensional information by connecting the received surface images of the recording medium P in the conveying direction of the recording medium P. In the steps, "j" represents the pixel position in the conveying direction.

In Step S303, Step S302 is repeated until a number of pixels equal to the prestored required number of pixels dot_h in the conveying direction are acquired. In the first embodiment, the required number of pixels dot_h is set at 118, and is stored in the storage unit 455. The required number of pixels dot_h is not limited to 118, and may be appropriately determined as long as the recording medium P can be identified accurately.

In Step S304, shading correction is conducted on the obtained surface image. This is because, even if the light quantity of the irradiation LED 41 is corrected, it is difficult to uniformly irradiate the effective image area. Consequently, differences in light quantity are formed in the effective image area, and this makes the surface image in the effective image area nonuniform. To reduce this influence, shading correction is performed. Shading correction is performed according to dark current data DB obtained when the irradiation LED 41 is off, and reference plate data DW. The irradiation LED 41 has the above-described light quantity distribution shown by the curve in FIG. 10A, and the reference plate data DW corresponds to a portion of the light quantity distribution in the effective image area shown in FIG. 10A. Corrected data is designated as Dj[0] to Dj[dot_w]. A description will now be given of shading correction of an i-th pixel in a j-th line as an example.

First, dark current data DB[i] is subtracted from brightness information POj[i] to remove the influence of dark current noise. Next, to remove the influence of variations in light quantity, the obtained light quantities are matched to the predetermined light quantity correction value (192 in this case), and Dj[i] is obtained, that is, (POj[i]−DB[i])×192/DW[i], so that shading correction can be made. By shading correction, the above-described surface image shown in FIG. 10B is obtained.

In Step S305, surface irregularities are extracted from a plurality of images of the recording medium P subjected to shading correction, and feature values of surface roughness are calculated. For calculation, a histogram is formed on the basis of brightness information about the image area, and a standard deviation is obtained from the histogram. When an average value of all (i=0 to dot_w, j=0 to dot_h) of correction data Dj[i] is designated as DA, the standard deviation is given by the square root of (the sum of (squares of (Dj[i]−DA))+frequency).

Figure 12:
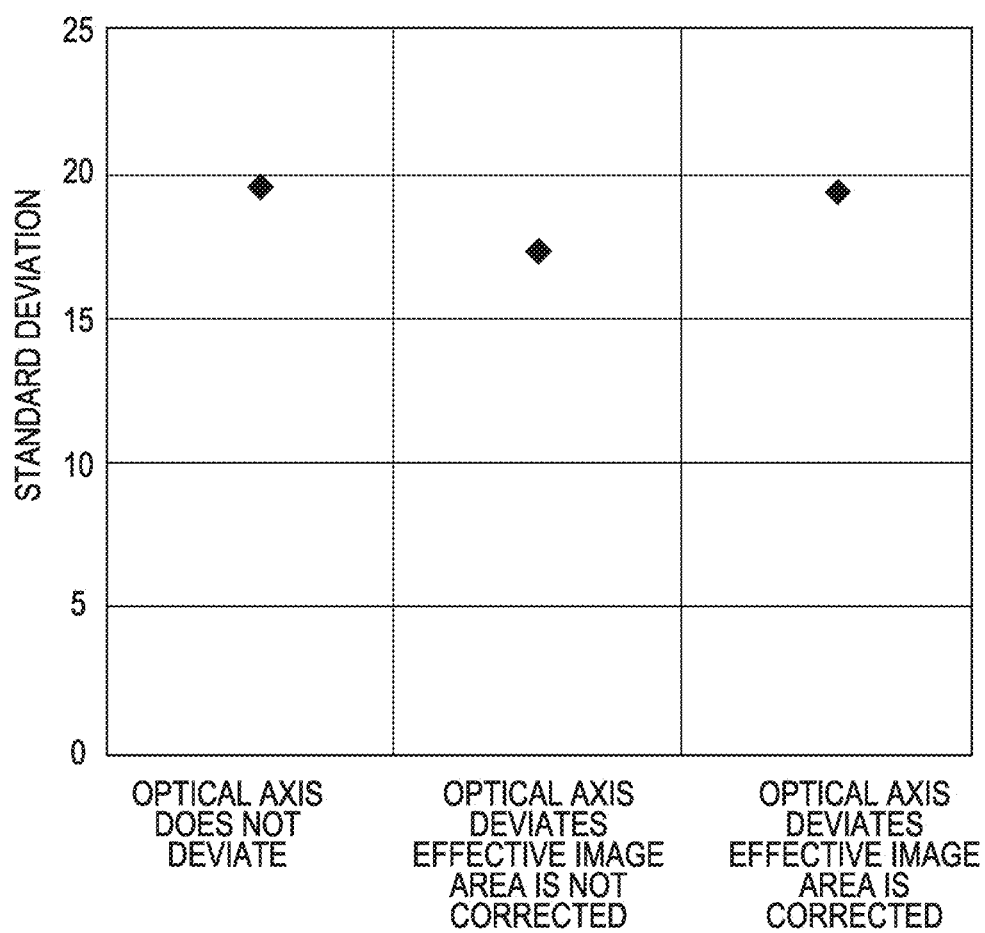
FIG. 12 shows calculated feature values of the images subjected to shading correction in the recording-medium imaging device of the first embodiment.

FIG. 12 shows a calculated feature value of surface roughness from the surface image shown in FIG. 10B. FIG. 12 also shows feature values calculated from the surface image shown in FIG. 5C provided when the optical axis is at the desired designed position without deviation and the surface image shown in FIG. 5D provided when the optical axis is not at the desired designed position. In this case, the same recording medium P is used for identification.

The feature value obtained from the surface image shown in FIG. 5D provided when the optical axis does not deviate is smaller than the feature value obtained from the surface image shown in FIG. 5C provided when the optical axis deviates. This is because the image area that is not sufficiently irradiated with light is selected, an accurate surface image is not acquired, and the output value decreases, as described above.

In contrast, the feature value obtained from the surface image shown in FIG. 10B whose effective image area is corrected from the state shown in FIG. 5D is substantially equal to the feature value obtained from the surface image shown in FIG. 5C without deviation of the optical axis. Hence, it can be determined that the recording medium is the same. This is because a sufficiently irradiated image area can be selected by correcting the effective image area and surface irregularities on the recording medium P can be clearly recognized.

Finally, in Step S206, the type of the recording medium P is identified on the basis of the obtained feature value, and the identification result is output to the image-forming-condition control unit 101 in the control section 10 shown in FIG. 4. The type of the recording medium P is identified by comparing the obtained feature value with a prestored output value for identifying the type of the recording medium P. The image-forming-condition control unit 101 controls the image forming conditions of the image forming apparatus in accordance with the identified type of the recording medium P.

By thus properly correcting the effective image area in accordance with the light quantity distribution, the type of the recording medium P can be identified while a sufficiently irradiated area can be selected. This reduces the influence of mounting accuracy of the irradiation LED 41. Since the effective image area is properly corrected, the identification accuracy can be made higher than when the effective image area is not corrected.

Figure 13:
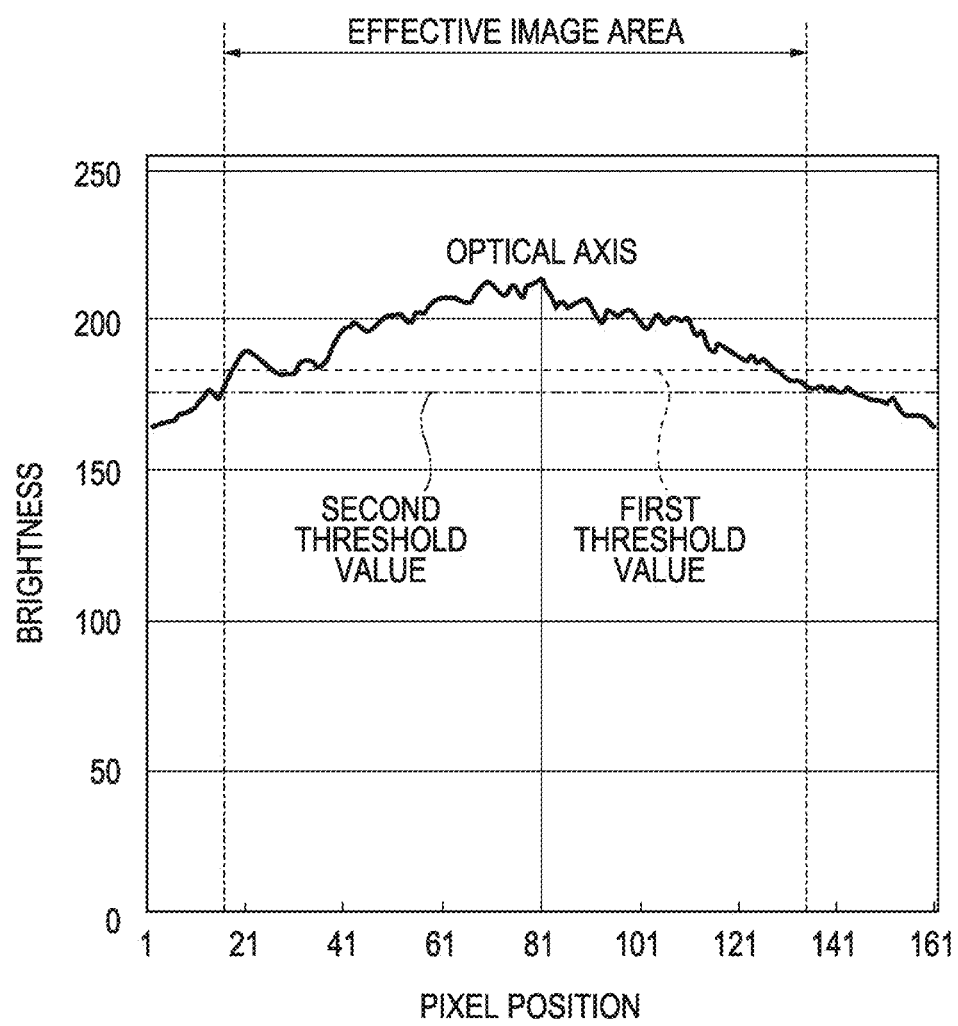
FIG. 13 is a brightness distribution chart provided when a threshold value for selecting an effective image area is lowered in the recording-medium imaging device of the first embodiment.

While the case in which the light quantity distribution exhibits a relatively smooth output waveform has been described above as an example, the light quantity distribution does sometimes not exhibit a smooth curve because of the characteristics of the CMOS line sensor and the imaging lens, as shown in FIG. 13. A description will now be given of how to determine the effective image area in this case, with reference to FIG. 13.

In the light quantity distribution shown in FIG. 13, when an area where pixels having brightnesses higher than a predetermined threshold value (first threshold value in FIG. 13) are provided serves as an effective image area, a continuous effective image area that meets the required number of pixels is sometimes not calculated. In this case, the effective image area is widened by lowering the threshold value (second threshold value in FIG. 13) within a range where the surface image can be accurately obtained. By thus allowing some latitude to the threshold value without affecting the surface image, it is possible to cope with variations in the brightness distribution. Further, when a plurality of areas can be selected as an effective image area, an area including the largest number of pixels having brightnesses more than or equal to the threshold value is selected as the effective image area.

Second Embodiment

Since structures of a second embodiment are realized by those adopted in the first embodiment shown in FIGS. 1 to 4, descriptions thereof are omitted. In the second embodiment, if an effective image area is corrected as in the first embodiment, a predetermined required number of pixels in a sensor direction is not ensured.

Figure 14:
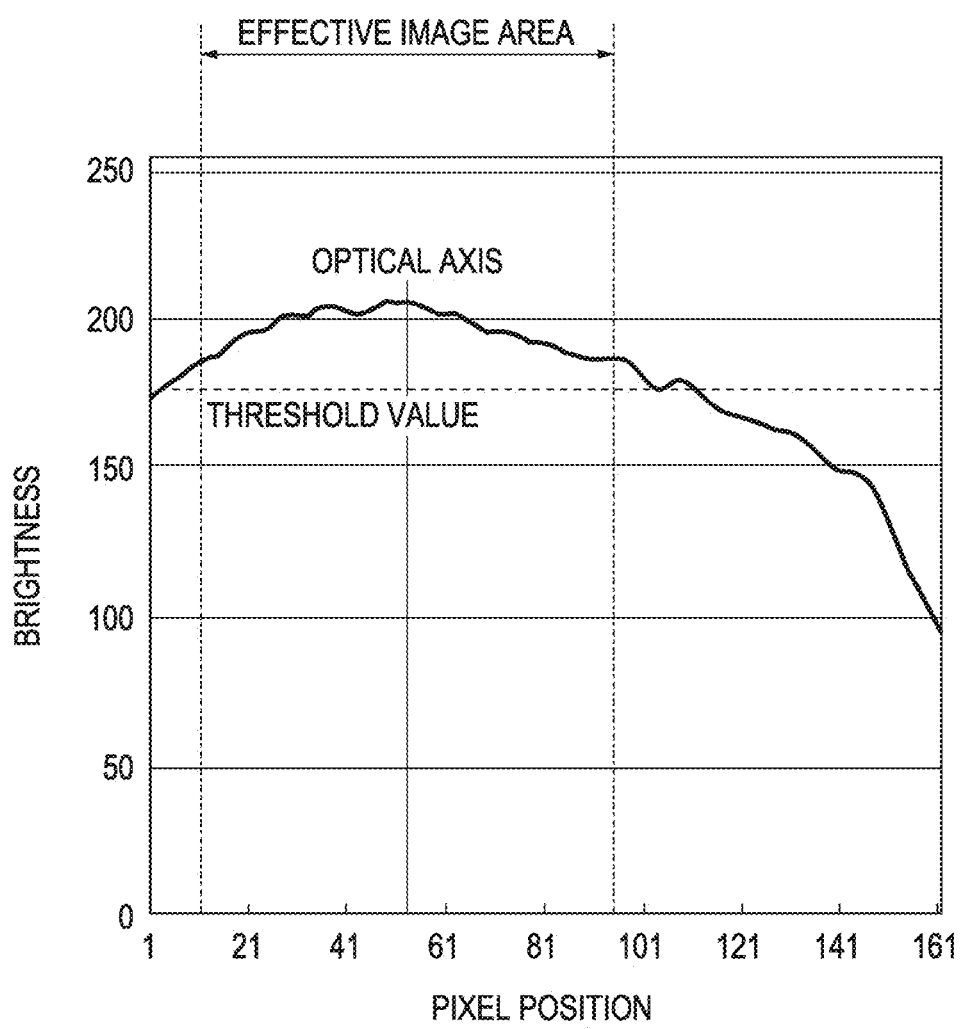
FIG. 14 is a brightness distribution chart provided when light is applied by the recording-medium imaging device according to the second embodiment.
Figure 15A:
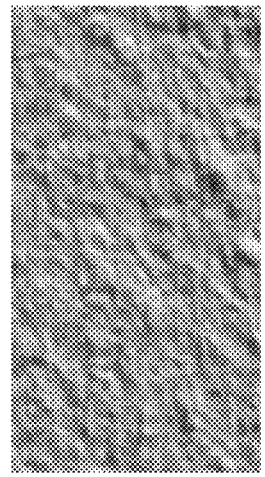
FIGS. 15A and 15B respectively show a surface image corrected for an effective image area according to the brightness distribution shown in FIG. 14, and a surface image corrected for the number of pixels in a conveying direction.

FIG. 14 shows a result of correction of an effective image area made on the basis of a certain light quantity distribution by the above-described method of the first embodiment. The effective image area is corrected to extend from a pixel position 10 to a pixel position 79. FIG. 15A shows an image extracted after the effective image area is corrected. The size of the image is 70 dot×118 dot (corresponding to 3 mm×5 mm at 600 dpi). As shown in FIG. 15A, a sufficiently irradiated area is selected. Accordingly, by changing the required number of pixels in the sensor direction on the basis of the light quantity distribution, a surface image that does not include an insufficiently irradiated area can be picked up. This suppresses a decrease in identification accuracy for the recording medium.

As shown in FIGS. 14 and 15A, an accurate surface image can be obtained by correcting the effective image area. However, if the required number of pixels in the sensor direction decreases, the number of pixels in the obtained surface image sometimes falls short of the number of pixels necessary for identification of the recording medium P. Hereinafter, a description will be given of control exerted when the number of pixels necessary for identification of the recording medium P is not achieved.

When the required number of pixels in the sensor direction decreases, the type of the recording medium P needs to be identified on the basis of a feature value obtained from a smaller image area. The feature value of the smaller image area is different from that of the entire recording medium P, and this may cause erroneous identification of the type of the recording medium P. To avoid such erroneous identification and to ensure at least a fixed number of pixels in the image area, the number of lines to be picked up is increased by increasing the required number of pixels in the conveying direction, thereby enlarging the image area. The required number of pixels in the conveying direction is found by dividing a separately specified required number of pixels of the entire image area by the required number of pixels in the sensor direction that is found by the above-described method. Incidentally, the required number of pixels in the conveying direction depends on the moving distance of the recording medium P during measurement, that is, is within a distance from a position where measurement starts to a rear end of the recording medium P.

A method of the second embodiment for changing the required number of pixels in the conveying direction will be described below with concrete numerical values. In a case in which the total required number of pixels is 13924 (118×118), when the required number of pixels in the sensor direction is 70, the required number of pixels in the conveying direction is 199. Since the number of pixels is a natural number, the result of division needs to be rounded off. Preferably, the required number of pixels in the conveying direction is as close as possible to the total required number of pixels.

Figure 15B:
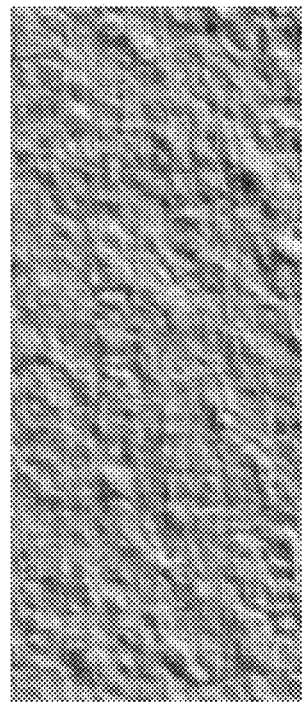

FIG. 15B shows a surface image extracted from the corrected image area. In this case, the size of the surface image is 70 dot×199 dot (corresponding to 3 mm×8.3 mm at 600 dpi). By thus increasing the required number of pixels in the conveying direction, the total number of pixels in the image area can be increased, and the accuracy of the image serving as the reference of identification of the type of the recording medium P is increased. As a result, the accuracy in identifying the type of the recording medium P can be improved.

Figure 16:
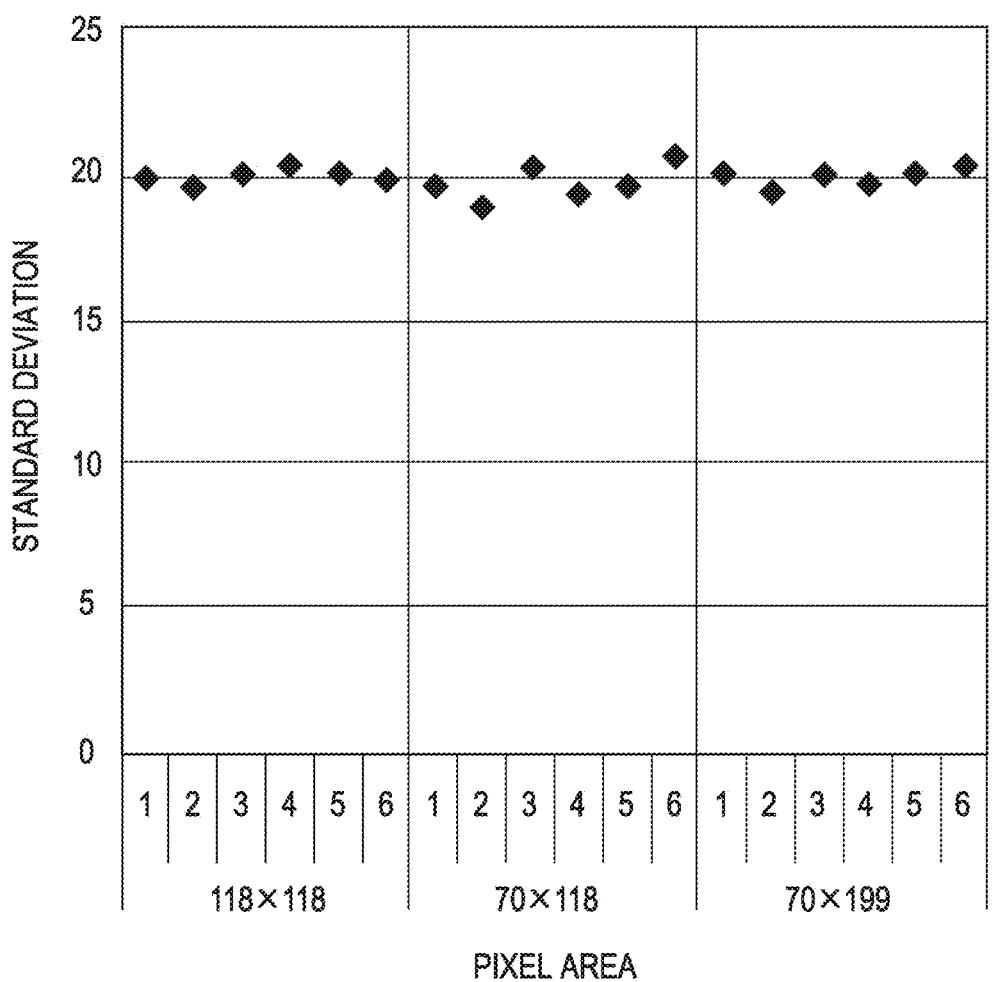
FIG. 16 shows calculated feature values of images subjected to shading correction in the recording-medium imaging device of the second embodiment.

Measurement was performed six times in each of the cases in which the size of the surface image was 118 dot×118 dot (corresponding to 5 mm×5 mm at 600 dpi), 70 dot×118 dot (corresponding to 3 mm×5 mm at 600 dpi), and 70 dot×199 dot (corresponding to 3 mm×8.3 mm at 600 dpi). FIG. 16 shows feature values calculated in these cases. As shown in FIG. 16, in the image area having the size of 70 dot×118 dot in which the required number of pixels in the conveying direction is not changed, the output varies greatly. In contrast, in the image areas having the sizes of 118 dot×118 dot and 70 dot×199 dot, the output does not greatly vary, and the degree of variation is substantially equal.

Thus, as the size of the image area decreases, the variation of the output increases, and the identification accuracy of the recording medium P decreases. In this case, the required number of pixels necessary for the identification of the recording medium P is ensured by increasing the required number of pixels in the conveying direction. By correction of the image area, the identification accuracy for the recording medium P can be made higher than when the image area is not corrected.

Third Embodiment

Figure 17A:
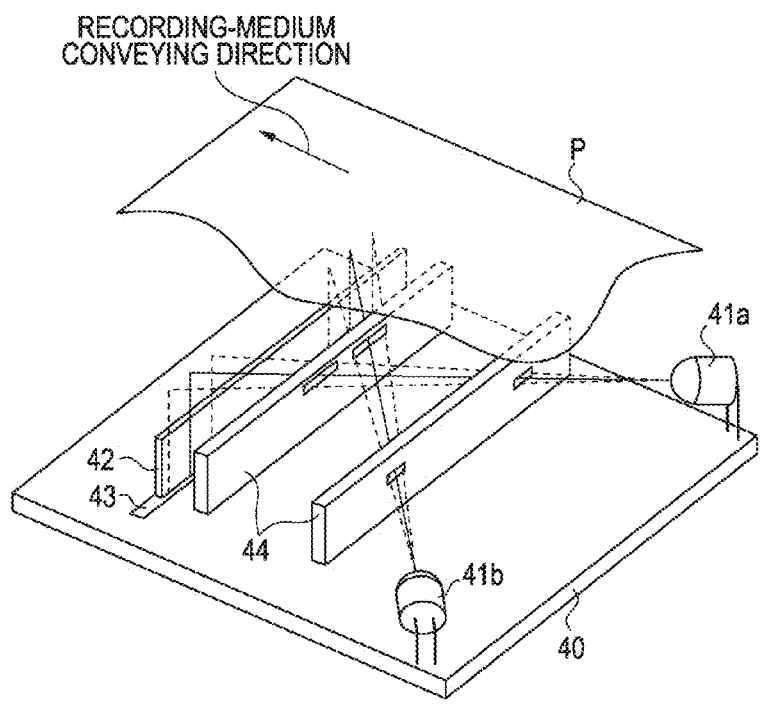
FIGS. 17A and 17B are a perspective view and a cross-sectional view, respectively, illustrating a configuration of a recording-medium imaging device according to a third embodiment.

Since structures of a third embodiment can be realized by those of the first embodiment shown in FIGS. 1 to 4, descriptions thereof are omitted. A description will be given of a recording-medium imaging device 40 of the third embodiment as a difference from the first embodiment. As shown in FIG. 17A, the recording-medium imaging device 40 is characterized in having a plurality of light sources. While two LEDs are provided as the light sources in the following description, the number of LEDs is not limited to two, and more LEDs may be provided.

The recording-medium imaging device 40 includes the following components: An irradiation LED 41a and an irradiation LED 41b serve as irradiation units for irradiating a surface of a recording medium P with light. An imaging lens 42 serves as an imaging unit for imaging reflected light of the irradiation light from the surface of the recording medium P. A CMOS line sensor 43 serves as an image pickup unit for receiving the light image formed by the imaging unit. Slit structure members 44 guide the light emitted from the irradiation LEDs 41a and 41b in arbitrary directions. Here, the term "arbitrary directions" will be described below with reference to FIG. 18.

A mechanism for conveying the recording medium P includes a conveying roller 5 for conveying the recording medium P, a conveying opposing roller 6 opposing the conveying roller 5, and a conveying guide (not shown) for forming a conveying path for the recording medium P. Referring to FIG. 17A, the irradiation LEDs 41a and 41b adopted in the third embodiment are formed by bullet white LEDs. The irradiation LEDs 41a and 41b are not limited to the bullet white LEDs as long as they allow acquisition of a surface image of the recording medium P.

Figure 17B:
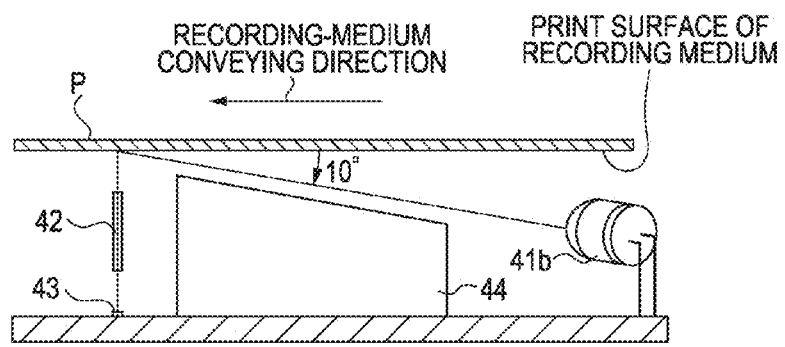

Referring to FIG. 17B, the imaging lens 42 is set orthogonal to the conveying direction of the recording medium P, and images reflected light of the irradiation light from the irradiation LEDs 41a and 41b that is reflected from the surface of the recording medium P. The image of reflected light formed by the imaging lens 42 is picked up by the CMOS line sensor 43.

In the third embodiment, the irradiation LEDs 41a and 41b apply light onto the surface of the recording medium P at an angle of 10 degrees. This angle is just exemplary, and is not always limited to 10 degrees as long as a sufficient image for identification of the recording medium P can be obtained.

Figure 18:
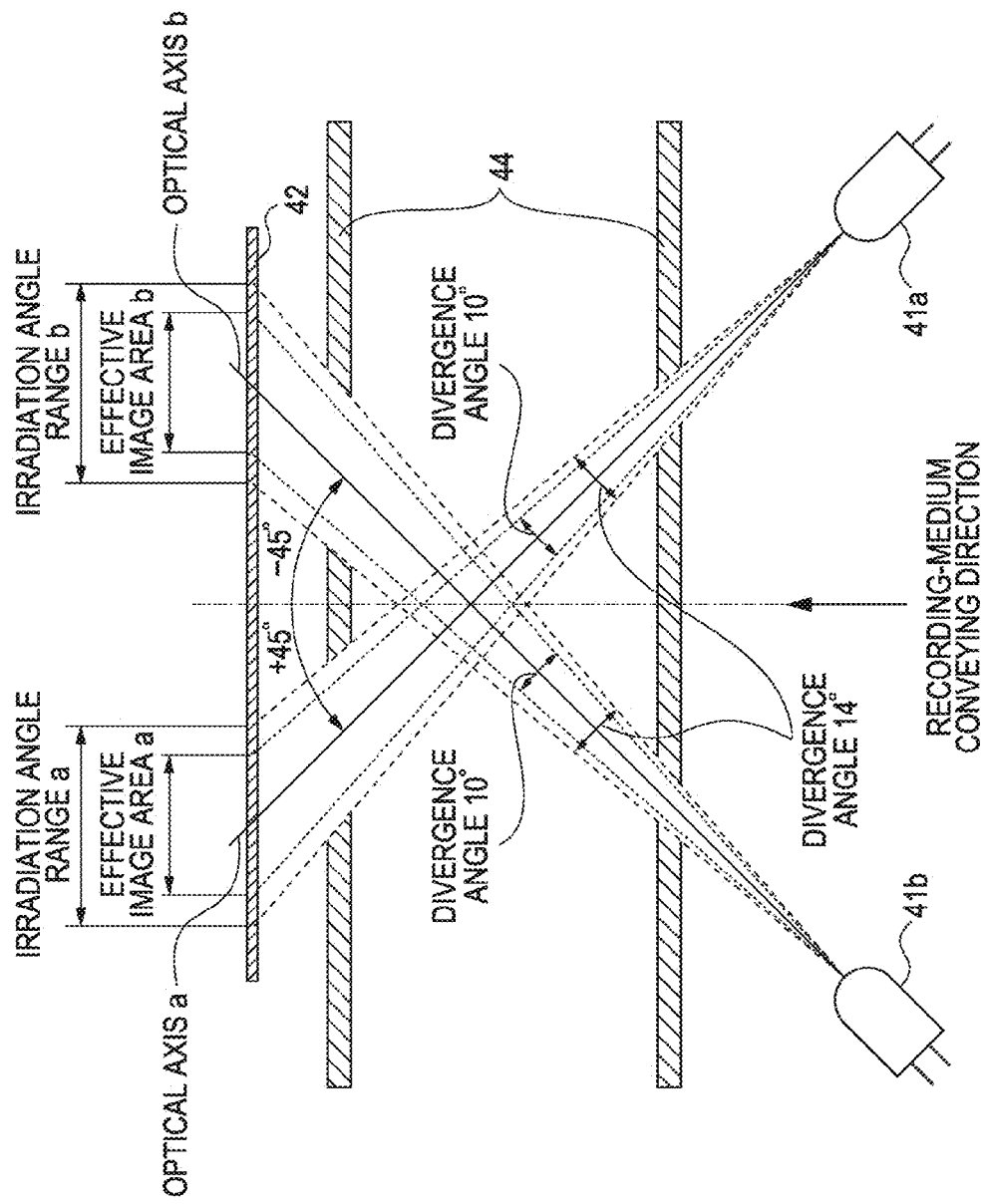
FIG. 18 is a sectional top view illustrating the configuration of the recording-medium imaging device of the third embodiment.

Referring to FIG. 18, the irradiation LED 41a is provided in a manner such that the optical axis of emitted light therefrom is shifted counterclockwise by 45 degrees (+45 degrees) from the conveying direction of the recording medium P (first direction). The irradiation LED 41b is provided in a manner such that the optical axis of emitted light therefrom is shifted clockwise by 45 degrees (−45 degrees) from the conveying direction of the recording medium P (second direction). These angles serve as the arbitrary directions described above with reference to FIG. 17A.

An irradiation angle range "a" is a range in which the light emitted from the irradiation LED 41a is applied onto the recording medium P, and an irradiation angle range "b" is a range in which the light emitted from the irradiation LED 41b is applied onto the recording medium P. A surface image of the recording medium P can be picked up in the irradiation angle ranges "a" and "b". An effective image area "a" is a part of the irradiation angle range "a" that is used to identify the type of the recording medium P, and an effective image area "b" is a part of the irradiation angle range "b" that is used to identify the type of the recording medium P. Here, the term "optical axis" is defined as light on the center axis of each of the irradiation LEDs 41a and 41b. Ideal designed positions of the irradiation LEDs 41a and 41b are such that the optical axes thereof are at the centers of the above-described irradiation angle ranges. In actuality, however, the optical axes are sometimes not located at the centers of the irradiation angle ranges, for example, because of mounting accuracy.

In the third embodiment, for example, a divergence angle of the light emitted from the irradiation LEDs 41a and 41b serving as the light sources is set at 14 degrees, an irradiation angle of the irradiation LED 41a is set at +38 to +52 degrees, and an irradiation angle of the irradiation LED 41b is set at −38 to −52 degrees. The effective image areas "a" and "b" are used to identify the type of the recording medium P. In the effective image areas, the divergence angle of the light emitted from the irradiation LEDs 41a and 41b is set at 10 degrees that is smaller than in the irradiation angle ranges. The irradiation angle of the irradiation LED 41a is set at +40 to +50 degrees, and the irradiation angle of the irradiation LED 41b is set at −40 to −50 degrees. The effective image areas "a" and "b" may be determined on a basis other than the divergence angle from the light source as in the third embodiment as long as they are narrower than the irradiation angle ranges.

The slit structure members 44 are located so that light emitted from the irradiation LED 41a or the irradiation LED 41b is applied onto the recording medium P at the above-described angle. By placing the slit structure members 44, the direction in which light is applied to the pixels of the CMOS line sensor 43 can be uniquely specified, and this allows calculation of the above-described optical axis.

Further, the slit structure members 44 prevent light emitted from the irradiation LED 41a from being applied onto an area of the surface of the recording medium P to be irradiated by the irradiation LED 41b. Conversely, the slit structure members 44 prevent light emitted from the irradiation LED 41b from being applied onto an area of the surface of the recording medium P to be irradiated by the irradiation LED 41a. In this way, the irradiation directions of the irradiation LED 41a and the irradiation LED 41b are limited in order to accurately irradiate the surface of the recording medium P. By limiting the irradiation directions by the slit structure members 44, the direction in which light is applied to the pixels of the CMOS line sensor 43 can be uniquely specified. While the slit structure members 44 are used as members for guiding light in the third embodiment, for example, optical waveguide members may be used to specify the irradiation direction. Further, a plurality of images can be obtained by applying light at different times in correspondence with the light irradiation directions.

Next, light quantity correction will be described. An irradiation control section 102 shown in FIG. 4 corrects the light quantity so that the irradiation LED 41a or irradiation LED 41b emits a predetermined quantity of light. In this case, light quantity correction is independently conducted on the irradiation LEDs 41a and 41b. Since light quantity correction is made according to the control procedure adopted in the first embodiment described with reference to FIG. 8, a description of correction will be omitted. As a result of light quantity correction, when the light quantity differs between the irradiation directions, surface information is obtained in the irradiation directions while changing the measurement timing. Further, when there is no reference plate, light is applied onto the recording medium P, and light emission is controlled on the basis of surface information about the recording medium P so that the light quantity becomes a value stored in the storage unit 455.

Figure 19:
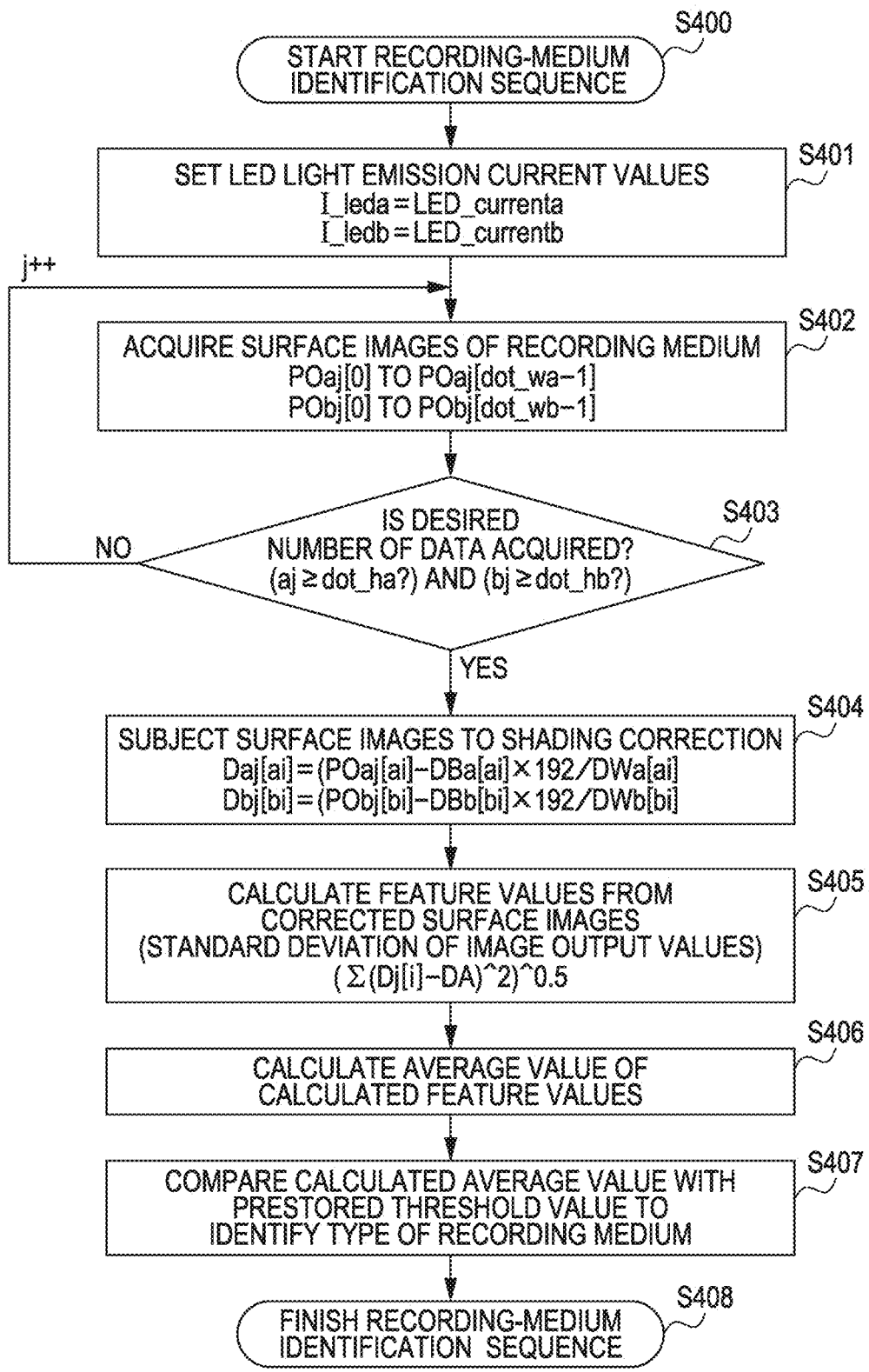
FIG. 19 is a flowchart showing a procedure for identifying the type of a recording medium in the recording-medium imaging device of the third embodiment.

Next, a sequence for identifying the recording medium P will be described with reference to FIG. 19. In Step S401, the irradiation LED 41a applies light onto the recording medium P on the basis of prestored LED light current values LED_currenta and LED_currentb. Similarly, the irradiation LED 41b applies light onto the recording medium P.

In Step S402, the CMOS line sensor 43 receives reflected light from the recording medium P, and outputs surface information images of the recording medium P to an identification unit 45. The identification unit 45 acquires two-dimensional image information by connecting the received surface information images in the conveying direction. In the steps, "j" represents the pixel position in the conveying direction.

In Step S403, Step S402 is repeated until a prestored required number of pixels dot_h in the conveying direction can be obtained. In the third embodiment, the required number of pixels dot_h in the conveying direction is set at 118, and is stored in a storage unit 455. The required number of pixels dot_h is not limited to 118, and may be arbitrarily determined as long as it allows accurate identification of the recording medium P.

Figure 20A:
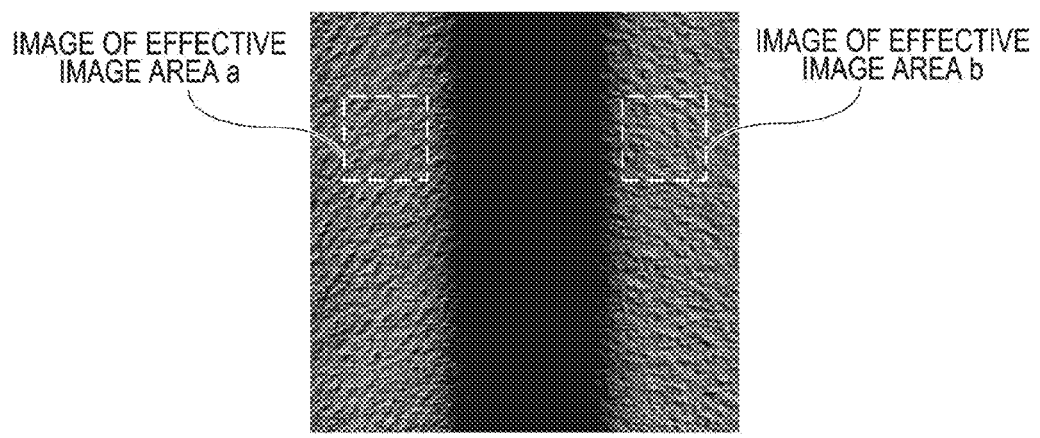
FIGS. 20A and 20B show surface images picked up by the recording-medium imaging device of the third embodiment.
Figure 20B:
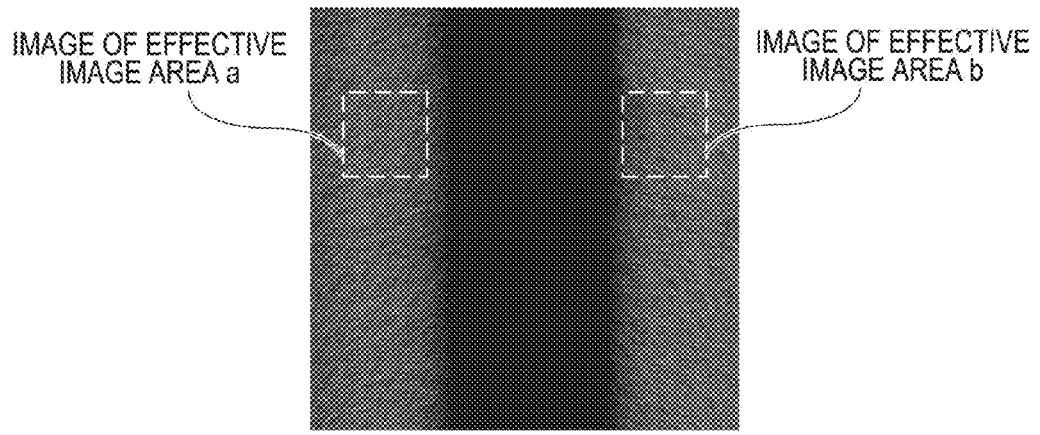

FIGS. 20A and 20B show surface images obtained in the above-described steps. FIG. 20A shows a surface image of rough paper, and FIG. 20B shows a surface image of plain paper. These surface images of the recording medium P shown in FIGS. 20A and 20B include pixels more than or equal to the required number of pixels in the conveying direction. FIGS. 21A and 21B show images obtained by extracting only a number of pixels necessary for identification of the recording medium P in Steps S402 and S403.

FIG. 21A shows images enclosed by dot lines in FIG. 20A, and FIG. 21B shows images enclosed by dot lines in FIG. 20B. The size of the image areas shown in FIGS. 21A and 21B is 118 dot×118 dot (corresponding to 5 mm×5 mm at 600 dpi). Images in the effective image area "a" in FIGS. 21A and 21B are obtained when light is applied by the irradiation LED 41a (first surface images), and images in the effective image area "b" are obtained when light is applied by the irradiation LED 41b (second surface images).

In Step S404, shading correction is conducted on the obtained surface images. This is because, even when the quantities of light from the irradiation LEDs 41a and 41b are corrected, it is difficult to uniformly irradiate the effective image areas. As a result, differences in light quantity are formed in the effective image areas, and the surface images in the effective image areas are not uniform because of the differences in light quantity. To reduce this influence, shading correction is performed. Since a method of shading correction is similar to that adopted in the first embodiment, a description thereof is omitted here.

FIGS. 22A and 22B show images obtained by conducting shading correction on the images shown in FIGS. 21A and 21B. Images in the effective image area "a" in FIGS. 22A and 22B are obtained when light is applied by the irradiation LED 41a, and images in the effective image area "b" are obtained when light is applied by the irradiation LED 41b.

In Step S405, feature values of the surface images subjected to shading correction are calculated. For calculation, histograms are formed on the basis of brightness information about the image areas, and standard deviations are obtained from the histograms. In Step S406, an average value of the feature values calculated in Step S405 is found. FIG. 23 shows feature values calculated from the images shown in FIGS. 22A and 22B.

FIG. 23 shows results of measurement taken during longitudinal and lateral conveyance of rough paper and plain paper. Longitudinal conveyance means conveyance in the longitudinal direction of the recording medium P, and lateral conveyance means conveyance in the lateral direction of the recording medium P.

In FIG. 23, "irradiation LED 41a" indicates a feature value of the image obtained from light emitted from the irradiation LED 41a, and "irradiation LED 41b" indicates a feature value of the image obtained from light emitted from the irradiation LED 41b. Also, "irradiation LED 41a and irradiation LED 41b" indicates an average feature value of the images obtained from light from the two light sources. From these output values, it is known that the calculated feature value greatly differs between longitudinal conveyance and lateral conveyance. The feature values of the irradiation LED 41a and the irradiation LED 41*b* based on the images obtained from the light in one irradiation direction greatly differ between longitudinal conveyance and lateral conveyance. In contrast, the feature values of the irradiation LED 41*a* and the irradiation LED 41*b* based on the images obtained from the light in two irradiation directions doe not greatly vary between longitudinal conveyance and lateral conveyance because the average value thereof is used. The output value thus varies between longitudinal conveyance and lateral conveyance in the image obtained from light emitted in one irradiation direction because of the influence of the fiber direction of the recording medium P. Even in the image obtained from light in one irradiation direction, an accurate image can be obtained as long as an appropriate quantity of light is applied. However, if the irradiation direction happens to be substantially parallel to the fiber direction of the recording medium P, the accuracy of the surface image sometimes decreases.

To suppress such variations in accuracy of the surface image due to the irradiation direction and the fiber direction of the recording medium P, a surface image is obtained from light applied in two directions. As shown in FIG. 23, a stable accuracy can be maintained by judging from surface irregularities in the surface image, as shown in FIG. 23. In this case, when two LEDs serving as the light sources are arranged in a manner such that the angle difference therebetween is 90 degrees, if the contrast of the surface image obtained from light from one of the light sources increases, the contrast of the surface image obtained from light from the other light source decreases. Accordingly, even when the conveying direction of the recording medium differs, a high-contrast surface image and a low-contrast surface image can be simultaneously obtained, and therefore, the type of one recording medium P is identified on the basis of these two obtained surface images. This reduces the influence of the fiber direction.

Since the influence of the fiber direction can be thus reduced by identifying the type of the recording medium P on the basis of the surface images obtained at two different angles, an accurate feature value can be obtained. As a result, variations in feature value according to the conveying direction of the recording medium P are reduced, and the accuracy in identifying the type of the recording medium P can be improved. While the average value of the feature values calculated from light from two light sources is used for identification of the recording medium P in the third embodiment, a similar result can also be obtained by simply adding the feature values.

Finally, in Step S407, the type of the recording medium P is identified on the basis of the obtained feature value, and the identification result is output to an image-forming-condition control unit 101 in a control section 10 in FIG. 4. The obtained feature value is compared with an output value prestored for specifying the type of the recording medium, thereby identifying the type of the recording medium P. An image-forming-condition control unit 101 controls the image forming conditions of the image forming apparatus on the basis of the identified type of the recording medium P. While two surface images obtained from light emitted in two different directions are acquired as one two-dimensional image in the third embodiment, they may be independently obtained with respective imaging devices.

As described above, when the type of the recording medium P is identified on the basis of two surface images, an accurate result can be obtained by providing the same number of pixels in the image areas of the surface images. If the surface images are independently subjected to correction, the number of pixels may differ between the image areas. If the feature values are calculated in the condition where the number of pixels is different between the image areas, the influence of the feature value obtained from the image area including a larger number of pixels increases. In this case, the obtained result depends on one of the surface images, and accurate identification may be difficult.

To avoid this circumstance, the number of pixels is made equal between the surface images, whereby the recording medium P can be identified without depending on a specific surface image. That is, when the number of pixels is different between two obtained surface images, a selection area of one surface image including a larger number of pixels is changed by correction of the effective image area so that the number of pixels is matched to a smaller number of pixels of the other surface image. By matching the number of pixels of the two surface images to the smaller number of pixels, it is possible to suppress a phenomenon in which the influence of one of the surface images is strongly reflected and the accuracy in identifying the type of the recording medium P decreases. While two surface images are used as an example, similar control can also be exerted when more than two surface images are used. Further, while the number of pixels is equal between two surface images, it may not always be equal as long as the difference in number of pixels is too small to cause a large dependency on one of the surface images. In a case in which it can be determined that one of the surface images is not normal because of the influence of the fiber, the surface image is not used for identification of the type of the recording medium, but identification may be made on the basis of the other surface image.

While the CMOS line sensor is used as an example of an image pickup device in the above, a two-dimensional image pickup device, such as an area sensor, may be used. By picking up a surface image while conveying the recording medium P in accordance with the length of the effective image area in the conveying direction, the effective image area in the conveying direction can be enlarged.

As in the above description of correction of the effective image area, when the result of division is larger than the maximum number of pixels in the conveying direction (resolution of line sensor×recording-medium conveying distance), the number of pixels in the extracted image area does not reach the required number of pixels. In this case, the numbers of pixels in a plurality of image areas can be fixed by matching, to the number of pixels in the smallest image area having the smallest effective image area, the number of pixels in the other image area. This makes the number of pixels equal between a plurality of image areas, and suppresses a decrease in identification accuracy of the recording medium P due to the difference in number of pixels.

Fourth Embodiment

Since structures of a fourth embodiment can be realized by those adopted in the first embodiment shown in FIGS. 1 to 4, descriptions thereof are omitted. A description will now be given of a white reference plate as a difference from the first embodiment.

Figure 24A:
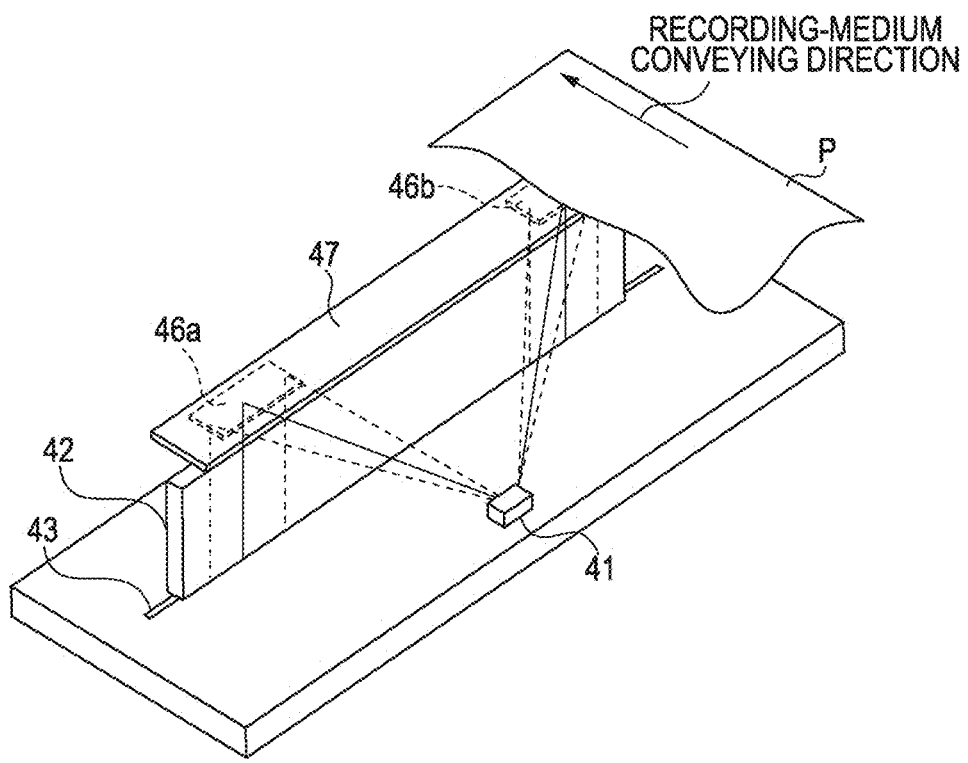
FIGS. 24A and 24B are a perspective view and a cross-sectional view, respectively, illustrating a configuration of a recording-medium imaging device according to a fourth embodiment.

A recording-medium imaging device 40 according to the fourth embodiment of the present invention will be described with reference to FIGS. 24 and 25. FIG. 24A shows a configuration of the recording-medium imaging device 40 for obtaining a surface image in which surface smoothness is reflected. FIGS. 24B and 25 are a cross-sectional view and a top perspective view, respectively, of the recording-medium imaging device 40 shown in FIG. 24A.

The recording-medium imaging device 40 includes the following components: A LED 41 serves as an irradiation unit for irradiating a surface of a recording medium P with light. An imaging lens 42 serves as an imaging unit for imaging reflected light of the irradiation light from the surface of the recording medium P. A CMOS line sensor 43 serves as an image pickup unit for picking up the image formed by the imaging unit. Light emitted from the LED 41 impinges on the recording medium P, and is reflected by a reflecting portion of the recording medium P. The light reflected by the reflecting portion is picked up as a surface image by the CMOS line sensor 43. Reference plates 46a and 46b (an inner reference plate 46a and an inner reference plate 46b) are provided at ends of an area that can be irradiated with light from the irradiation unit and at positions closer to the image pickup unit than the reflecting portion. A protective member 47 protects the imaging lens 42 and the LED 41. The inner reference plates 46a and 46b are provided on a surface of the protective member 47 facing the imaging lens 42. A mechanism for conveying the recording medium P includes a conveying roller 5 for conveying the recording medium P, a conveying opposing roller 6 opposing the conveying roller 5, and a conveyance guide (not shown) for forming a conveying path of the recording medium P. While the inner reference plates 46a and 46b are arranged on the surface of the protective member 47 in the third embodiment, they may be arranged on a molded member of the image forming apparatus body, for example, when the protective member 47 is not provided.

Figure 24B:
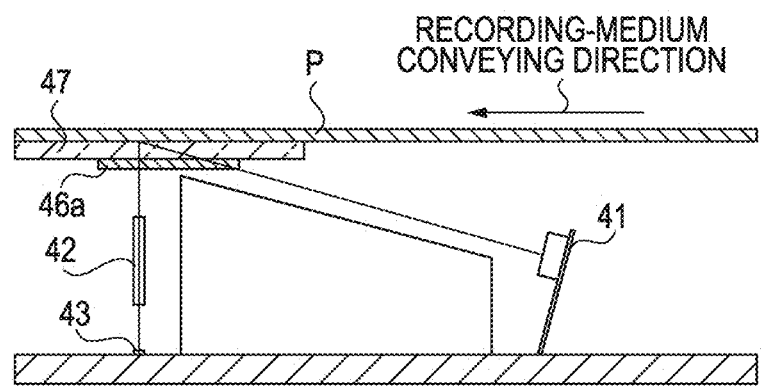
Figure 25:
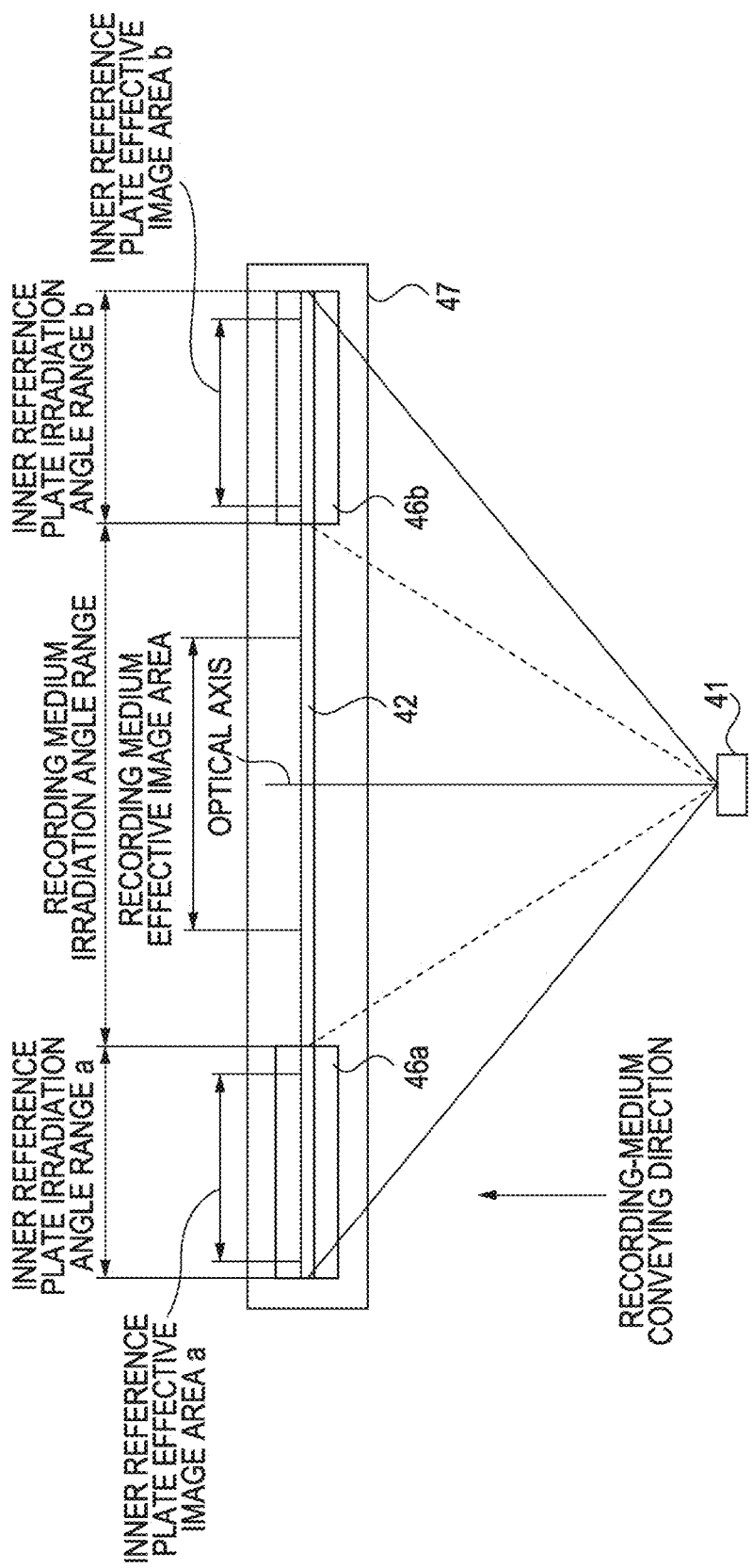
FIG. 25 is a sectional top view illustrating the configuration of the recording-medium imaging device of the fourth embodiment.

As shown in FIG. 24B, the imaging lens 42 and the CMOS line sensor 43 are set orthogonal to the conveying direction of the recording medium P. Hence, reflected light of the irradiation light, which is emitted from the LED 41, reflected from the surface of the recording medium P and reflected light from the inner reference plates 46a and 46b can be imaged simultaneously. The LED 41 is located so as to apply light onto the surface of the recording medium P at an angle of 10 degrees. In this case, the LED 41 also applies light onto the inner reference plate 46a and 46b. This angle is just exemplary, and is not always limited to 10 degrees as long as it allows a sufficient image for identification of the recording medium P to be obtained. While the irradiation unit is formed by a white LED in the fourth embodiment, it is not limited to the white LED as long as it can irradiate the recording medium P. Further, while the image pickup unit is formed by the CMOS line sensor 43, for example, it can be formed by a two-dimensional area sensor.

As shown in FIG. 25, the LED 41 is ideally mounted in a manner such that the optical axis thereof is perpendicular to the center of the CMOS line sensor 43. However, in view of the mounting accuracy of the LED 41, the optical axis does not always need to be perpendicular, and it is only necessary that the LED 41 can apply light onto the inner reference plates 46a and 46b. A recording-medium irradiation angle range indicates a range where surface information about the recording medium P is acquired, and a recording-medium effective image area indicates a part of a surface image used to identify the type of the recording medium P on the basis of a brightness distribution of light emitted from the LED 41. A portion of the brightness distribution in which the brightness is higher than a threshold value serves as the recording-medium effective image area. Here, the threshold value satisfies the required identification accuracy of the recording medium P, and can be appropriately set, for example, in accordance with the type of the LED 41 or the distance between the LED 41 and the CMOS line sensor 43. In the fourth embodiment, a threshold brightness is set at 180 (the brightness includes 256 levels (0 (dark) to 255 (bright)) in consideration of the shortest image pickup time of the CMOS line sensor 43 and the irregular reflectance. A surface image in the recording-medium effective image area is used to identify the type of the recording medium P. Inner-reference-plate irradiation angle ranges "a" and "b" on the inner reference plates 46a and 46b indicate ranges where surface information about the inner reference plates 46a and 46b is acquired. Inner-reference-plate effective image areas "a" and "b" are used to calculate the quantity of light reflected from each of the inner reference plates 46a and 46b.

Figure 26:
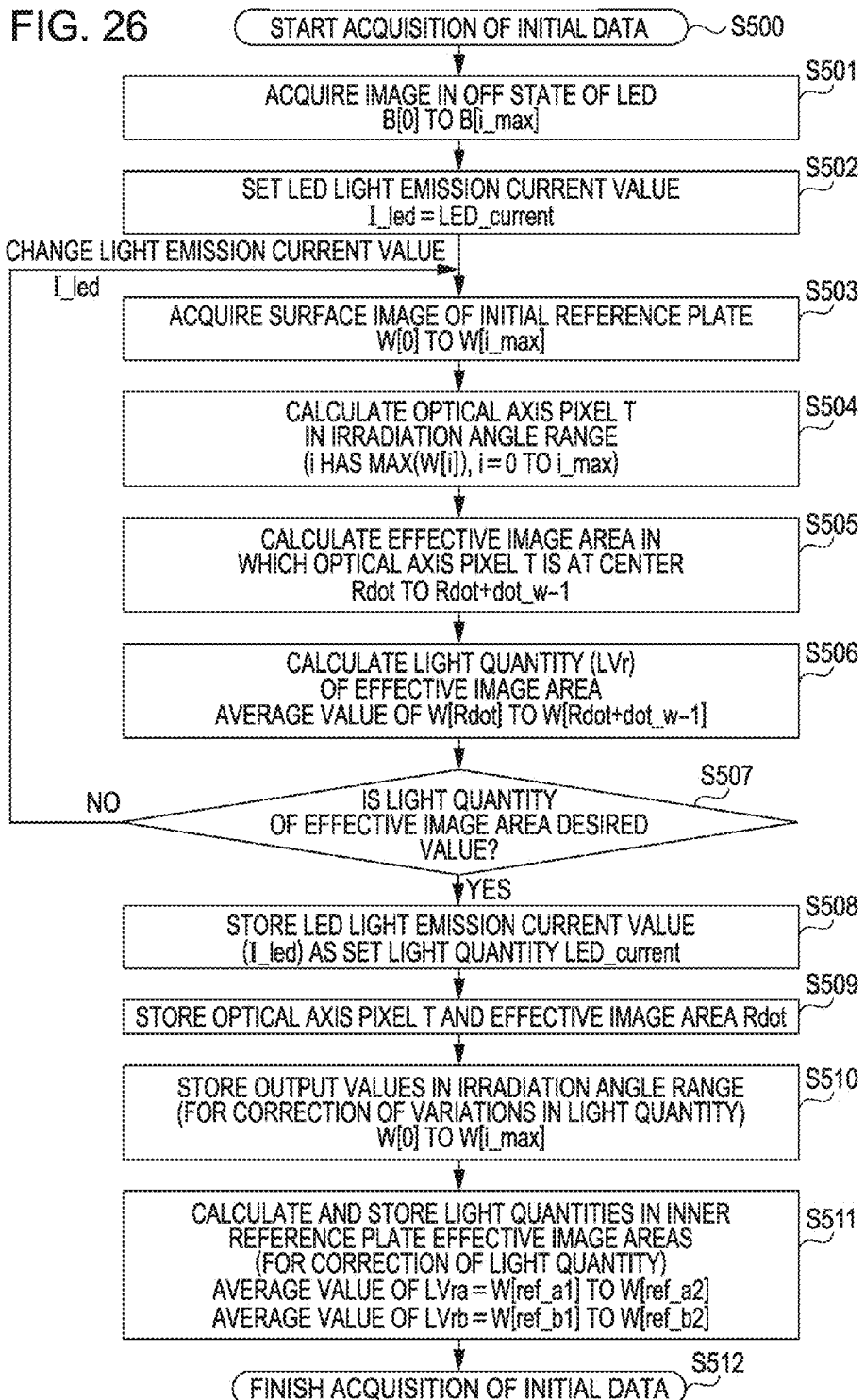
FIG. 26 is a flowchart showing a procedure for acquiring correction data in the recording-medium imaging device of the fourth embodiment.

First, a method for adjusting the light quantity of the LED 41 and acquiring light-quantity unevenness data in order to obtain a surface image of the recording medium P will be described with reference to a flowchart of FIG. 26. The light quantity of the LED 41 is adjusted for the following reasons. That is, when the light quantity is excessive, the quantity of light reflected from the recording medium P increases, and an obtained surface image becomes too bright. This may make it difficult to accurately obtain a feature value of the image. In contrast, when the light quantity is insufficient, an obtained surface image becomes too dark, and this may make it difficult to accurately obtain a feature value of the image. In addition, the quantity of light emitted from the LED 41 decreases with time. For this reason, adjustment is made so that the LED 41 emits a quantity of light suitable for pickup of the surface image.

To finely control the decrease in light quantity, for example, it is ideal to correct the light quantity every time one surface image of the recording medium P is picked up. Since correction of the light quantity and pickup of the surface image are performed at different times in the related art, it is necessary to ensure a time period when the recording medium is not conveyed, every time the light quantity is corrected. This lowers the throughput. In the fourth embodiment, since the inner reference plates 46a and 46b are provided between the recording medium P and the CMOS line sensor 43, surface images of the inner reference plates 46a and 46b can be picked up during a time period when a surface image of the recording medium P is obtained. This allows the light quantity to be corrected on the basis of the surface images of the inner reference plates 46a and 46b without reducing the throughput, for example, even when the conveying interval between the recording media is short during continuous printing. While the light quantity is corrected every time one surface image of the recording medium P is picked up in the fourth embodiment, the timing of correction of the light quantity can be set appropriately. Further, while an image of the next recording medium P is picked up with the corrected light quantity in the fourth embodiment, the timing when the corrected light quantity is reflected can be set appropriately.

Further, light-quantity unevenness data is acquired and shading correction is made because, even when the light quantity of the LED 41 is properly adjusted, it is difficult to irradiate the effective image area with a uniform quantity of light. Consequently, differences in light quantity are formed in the effective image area, and this makes the surface image in the effective image area nonuniform. To reduce this influence, shading correction is performed. In the fourth embodiment, initial data for shading correction is acquired with the reference recording medium or the reference plates, for example, before factory shipment.

In Step S500, acquisition of correction data starts. In Step S501, surface images are obtained with the CMOS line sensor 43 in a state in which the irradiation LED 41 is off, and are output as dark current data to an array B[0] to B[i_max]. This dark current data is brightness information used to remove noise such as ambient light, and serves as a black (dark portion) reference during shading correction that will be describe below. The dark current data is acquired by performing image pickup a plurality of times by the CMOS line sensor 43 and calculating average values for the pixels. In the fourth embodiment, the CMOS line sensor 43 has a resolution of 600 dpi and includes 468 pixels. Hence, a value i_max is set at 468−1, and the number of measurement operations is set at five. When outputs obtained in the measurement operations are designated as B1 to B5, (B1+B2+B3+B4+B5)/5=B.

In Step S502, the light quantity of the LED 41 is corrected. First, a light emission current value I_led of the LED 41 is set, and light is emitted from the LED 41. As the value I_led, a value LED_current stored in a storage unit 455 is used. The value LED_current is set at 0 or a predetermined default value. In the fourth embodiment, the LED 41 is caused to emit light by pulse width modulation (PWM) control, and a PWM control value at a duty ratio of 50% is a default value.

In Step S503, the LED 41 is caused to emit light, and an image is acquired with the CMOS line sensor 43. Here, a reference plate serving as a reference for initial data is set in the recording-medium effective image area, and light is applied onto the surfaces of the reference plate and the inner reference plates 46a and 46b. Reflected light from the reference plates is received by the CMOS line sensor 43, and brightness information is acquired from surface images of the reference plates, and is output to an array W[0] to W[i_max], thereby finding brightness information for one line of the CMOS line sensor 43. The value i_max is the above-described i_max=468−1.

In Step S504, an optical axis is detected from the obtained surface image of the reference plate. This detection is made to select a below-described recording-medium effective image area used to identify the type of the recording medium P. The optical axis is at a pixel having the highest brightness (brightest) in a brightness distribution of one line in the image area of the reference plate. In the fourth embodiment, moving average values WA (WA[i]=(W[i−1]+W[i]+W[i+1])/3, i=1 to 466) in the brightness distribution W[0] to W[i_max] are calculated, and an i-th pixel having the largest moving average value WA is found as the optical axis T.

In Step S505, a recording-medium effective image area is found from the pixels of the obtained optical axis. The recording-medium effective image area is defined by pixels having brightnesses more than or equal to a certain threshold value in the brightness distribution. The recording-medium effective image area is centered on the obtained optical axis, and is defined by a prestored required number of pixels dot_w in the sensor direction used for identification. That is, when the pixel at the optical axis is designated as T, the recording-medium effective image area extends from T−dot_w/2 to T+dot_w/2−1. Here, the recording-medium effective image area needs to include a natural number of pixels and to be within the recording-medium irradiation angle range.

In Step S506, a light-quantity correction amount calculating part 456 calculates an average brightness of the entire surface image in the recording-medium effective image area. In the fourth embodiment, an average value of brightnesses of pixels W[T−dot_w/2] to W[T+dot_w/2−1] is found. In Step S507, the value I_led of the LED 41 is adjusted so that the calculated average brightness becomes a desired light quantity correction value stored in the storage unit 455. When it is determined that the calculated average brightness is less than the desired value, the average brightness is adjusted by increasing the value I_led of the LED 41. By repeating measurement a plurality of times, the calculated average brightness is brought closer to the desired value. When the average brightness reaches the desired value, adjustment is finished.

In the fourth embodiment, the light quantity correction value at the reference plate serving as the reference for initial data is set at 192 (the brightness includes 256 levels (0 (dark) to 255 (bright)) in consideration of the shortest image pickup time of the CMOS line sensor 43 and the irregular reflectance. When the calculated average brightness does not change, it is determined that the light quantity of the LED 41 is the maximum, and adjustment is finished.

Figure 27:
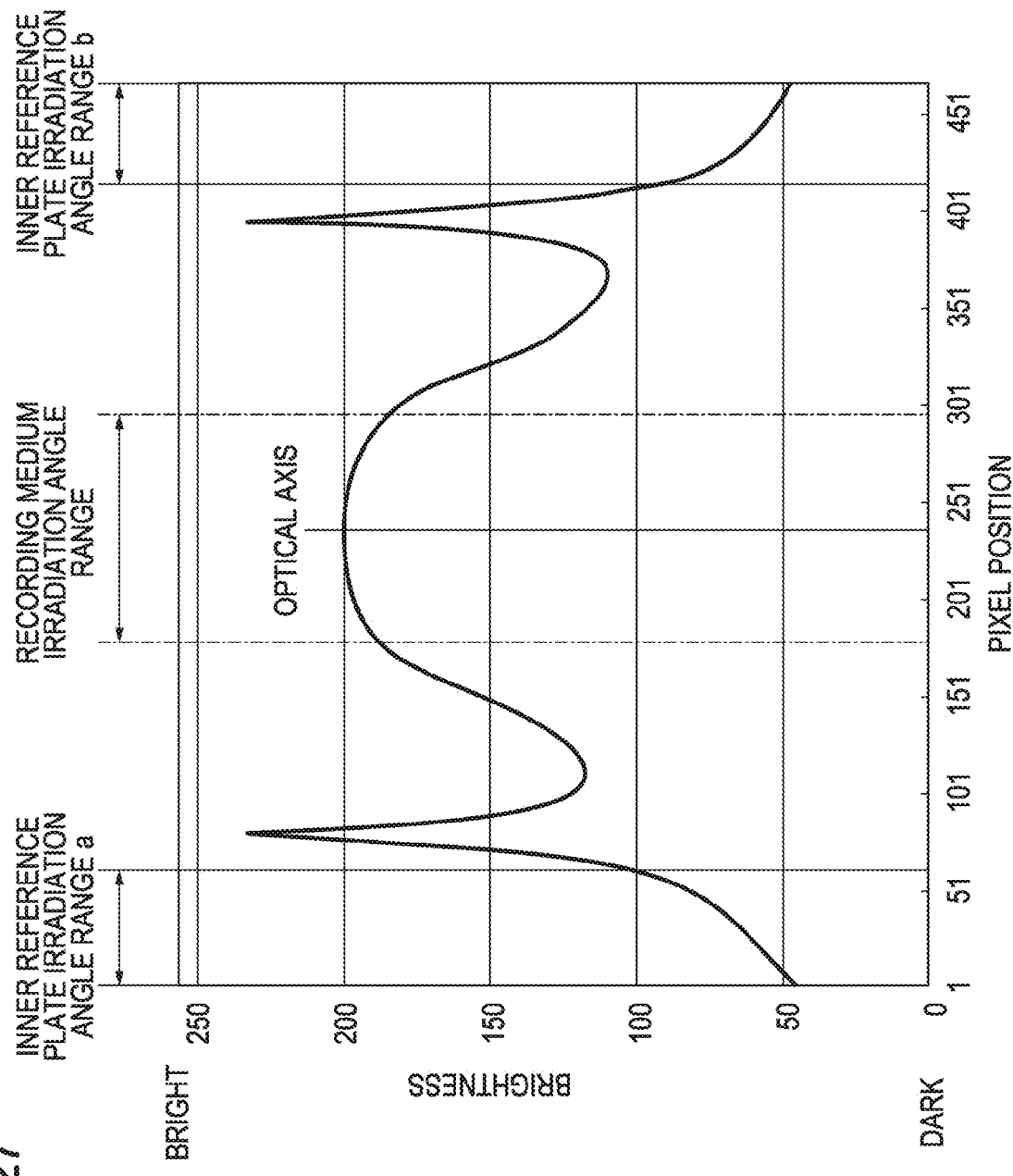
FIG. 27 is a brightness distribution chart of the correction data in the recording-medium imaging device of the fourth embodiment.
Figure 28A:
FIGS. 28A, 28B, and 28C respectively show the correction data, a surface image, and a surface image subjected to shading correction in the recording-medium imaging device of the fourth embodiment.

FIG. 27 is a graph showing outputs from the CMOS line sensor 43 when Step S507 is completed. FIG. 28A shows a surface image obtained when the number of effective pixels in the conveying direction is 42. Outputs at both ends represent surface images of the inner reference plates 46a and 46b, and the center output represents a surface image of the initial reference plate. In this case, the optical axis is at a pixel position 232, and a recording-medium effective image area is defined by pixel positions 173 to 290. The recording-medium effective image area is selected as an area having a brightness more than the threshold value. While the threshold value is set at 180 here, it may be appropriately set in accordance with the identification accuracy of the type of the recording medium P. The graph of FIG. 27 shows that the brightness is high at pixel positions 65 to 90 and pixel positions 380 to 405. In the fourth embodiment, these areas correspond to ends of the inner reference plates 46a and 46b, and the inner reference plates 46a and 46b are in contact with glass serving as the protective member 47. For this reason, light from the LED 41 is reflected by the protective member 47 and the ends of the inner reference plates 46a and 46b toward the CMOS line sensor 43, and therefore, the brightness is high. The surface image shown in FIG. 28A also includes high-brightness areas at both ends. Although the brightnesses of these portions are more than the threshold value of the recording-medium effective image area, the number of pixels having brightnesses more than the threshold value is small, so that it is determined that the brightness is locally high. Hence, these areas are not used as the recording-medium effective image area.

In Step S508, a light emission current value I_led of the LED 41 provided when Step S507 is completed is stored as LED_current. In Step S509, the pixel T at the optical axis and a pixel Rdot (=T−dot_w/2) in the recording-medium effective image area are stored. In Step S510, a light quantity LVr (average value of W[Rdot] to W[Rdot+dot_w−1]) and surface information (W[Rdot] to W[Rdot+dot_w−1]) about the recording-medium effective image area are stored in an array DW[0] to DW[dot_w−1]. Further, dark current data (B[Rdot] to B[Rdot+dot_w−1]) of the recording-medium image area is stored in an array DB[0] to DB[dot_w−1]. In Step S511, pixels ref_a1 to ref_a2 and a light quantity LVra (average value of the inner-reference-plate effective image area W[ref_a1] to W[ref_a2]) of the inner-reference-plate effective image area "a", and pixels ref_b1 to ref_b2 and a light quantity LVrb (average value of the inner-reference-plate effective image area W[ref_b1] to W[ref_b2]) of the inner-reference-plate effective image area "b" are stored in the storage unit 455. In consideration of the reflectance of the inner reference plates, the irradiation angle of the LED 41, the layout, etc., pixels having brightnesses within a range of 50 to 100 are used as the inner-reference-plate effective image areas "a" and "b". The brightnesses of the inner reference plates 46a and 46b are average brightnesses in the inner-reference-plate effective image areas shown in FIG. 27. Since the inner reference plates 46a and 46b are respectively arranged at both ends of the CMOS line sensor 43 in the fourth embodiment, two light quantities are calculated. These light quantities are stored as one correction datum in the storage unit 455. The surface images of the inner-referenceplate image areas "a" and "b" show the light quantity of the LED 41, and changes in light quantity of the LED 41 can be corrected by making the light quantity fixed.

Next, control for obtaining a surface image of the recording medium P will be described. The LED 41 applies light onto the recording medium P, which is being conveyed, according to the LED light emission current value stored in the storage unit 455. The CMOS line sensor 43 images reflected light from the recording medium P, and outputs a formed surface image of the recording medium P to an identification unit 45. When receiving the surface image of the recording medium P from the CMOS line sensor 43, the identification unit 45 converts voltage signals from analog to digital so as to obtain an image on the same line orthogonal to the conveying direction of the recording medium P. The identification unit 45 simultaneously receives surface images of the inner reference plates 46a and 46b provided at both ends. Since the quantity of light applied from the LED 41 onto the recording medium P can be calculated from the surface images of the inner reference plates 46a and 46b, the light quantity at the time of imaging of the recording medium P can be detected. For this reason, unlike the related art in which light quantity correction is performed in a state before imaging of the recording medium P in which the recording medium P is not being conveyed, light quantity correction can be performed while picking up a surface image of the recording medium P. Accordingly, the light quantity of the LED 41 during pickup of the surface image of the recording medium P can be detected and be corrected properly.

Next, a description will be given of a method for identifying the type of the recording medium P on the basis of the obtained surface image of the recording medium P, with reference to a flowchart of FIG. 29. In Step S600, image acquisition starts. In Step S601, the LED 41 applies light onto a recording medium P, which is being conveyed, and the inner reference plates 46a and 46b according to the prestored LED light emission current value LED_current.

In Step S602, the CMOS line sensor 43 images reflected light from the recording medium P and the inner reference plates 46a and 46b, and outputs surface images of the recording medium P and the inner reference plates 46a and 46b to the identification unit 45. Brightnesses of the surface images of the recording medium P are output to an array POj[0] to POj[i_max]. The identification unit 45 acquires a two-dimensional surface image by connecting the received surface images in the conveying direction. In the array, "j" represents the pixel position in the conveying direction.

In Step S603, light quantities LVa and LVb of the LED 41 are calculated from the obtained surface images of the inner reference plates 46a and 46b. Here, LVa represents the average value of outputs POj[ref_a1] to POj[ref_a2] from the pixels ref_a1 to ref_a2 in the inner-reference-plate effective image area "a", and LVb represents the average value of outputs POj[ref_b1] to POj[ref_b2] from the pixels ref_b1 to ref_b2 in the inner-reference-plate effective image area "b". In Step S604, the calculated light quantities LVa and LVb are compared with prestored light quantities LVra and LVrb of the inner reference plates 46a and 46b, thereby correcting the value I_led. As a result of comparison, for example, when the calculated light quantity LVa is smaller than the prestored light quantity LVra, the light quantity of the LED 41 is increased by increasing the LED light emission current value. Further, when the difference between the calculated light quantity LVa and the prestored light quantity LVra and the difference between the calculated light quantity LVb and the prestored light quantity LVrb are large, the LED light emission current value is controlled. When the differences between the calculated light quantities LVa and LVb and the prestored light quantities LVra and LVrb fall within a range of ±3%, the procedure is finished.

Figure 28B:
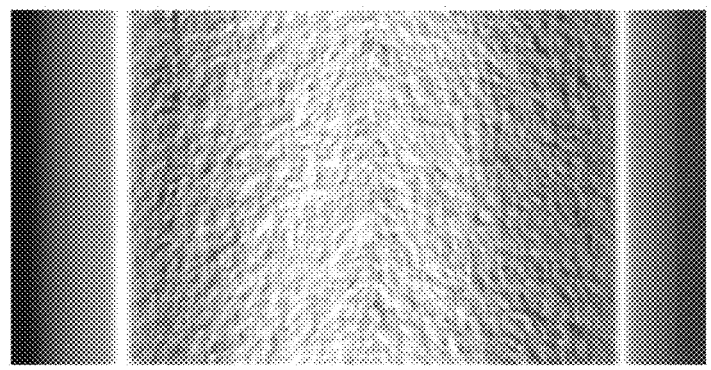

In Step S605, Steps S202 to S204 are repeated until the prestored required number of pixels dot_h are obtained. In Step S606, a value I_led provided when the last surface image of the recording medium P is picked up is stored. Since this value is used in the next operation of acquiring a surface image of the recording medium P, a surface image can be acquired without controlling correction of the light quantity in the next operation. Further, the light quantity of the LED 41 can be corrected on the basis of the surface images of the inner reference plates 46a and 46b while picking up the surface image of the recording medium P, and the surface image of the recording medium P can be more accurately obtained, for example, even when the conveying interval of recording media is short during continuous printing. FIG. 28B shows an image obtained from the surface images of the inner reference plates 46a and 46b and the surface image of the recording medium P. The center portion of the image indicates the surface image of the recording medium P, and both end portions of the image indicate the surface images of the inner reference plates 46a and 46b. The type of the recording medium P is identified using the surface image of the recording medium P, of these surface images, and the light quantity of the LED 41 is corrected using the surface images of the inner reference plates 46a and 46b.

In Step S607, shading correction is performed to correct variations in light quantity of the obtained surface image of the recording medium P. Shading correction is performed on the basis of dark current data DB obtained in an off state of the LED 41 and initial reference plate data DW. Variations in light quantity of the LED 41 are shown by the brightness distribution in FIG. 27. FIGS. 30A to 30C show the relationship among output values during shading correction. FIG. 30A shows a brightness distribution of reference data, FIG. 30B shows a brightness distribution before shading correction, and FIG. 30C shows a brightness distribution after shading correction. The reference data is prestored correction data on variations in light quantity. As shown in FIG. 30C, variations in light quantity are reduced in the surface image of the recording medium P by shading correction.

Figure 28C:
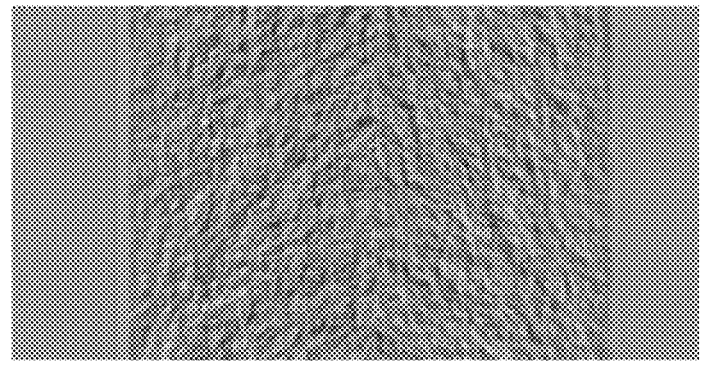

Since shading correction can be performed by a known method, a detailed description thereof is omitted. A description will now be given of a method for correcting variations in light quantity of an i-th pixel at a j-th line while data after shading correction are designated as Dj[0] to Dj[dot_w−1]. First, dark current data DB[i] is subtracted from brightness information POj[i] to remove the influence of dark current noise. Next, on the basis of the obtained difference, the light quantity is matched to a predetermined light quantity correction value (192 in this case). Then, Dj[i]=(POj[i]−DB[i])×192/DW[i]. FIG. 28C shows a surface image subjected to shading correction. The center portion of the image indicates a surface image of the recording medium P, and both end portions of the image indicate surface images of the inner reference plates 46a and 46b. This corrected image shows that variations in light quantity are corrected, in contrast to the surface image shown in FIG. 28B.

In Step S608, a feature value of surface irregularities is calculated from the surface image subjected to shading correction. For calculation, a histogram of brightnesses of the pixels in the surface image is formed, and a standard deviation of the brightness distribution is obtained from the histogram. When an average value of all data (i=0 to dot_w−1, j=0 to dot_h−1) of correction data Dj[i] is designated as DA, the standard deviation can be given by the square root of (the sum of (squares of (Dj[i]−DA))+frequency). In Step S609, the type of the recording medium P is identified on the basis of the obtained feature value, and the identification result is output to an image-forming-condition control unit 101 in the control section 10. The obtained feature value is compared with a prestored output value for specifying the type of the recording medium P, thereby identifying the type of the recording medium P. According to the obtained type of the recording medium P, the image-forming-condition control unit 101 controls the image forming conditions. While shading correction is performed after the surface image of the recording medium P is obtained in the fourth embodiment, it may be performed after surface images are obtained in lines.

Figure 31:
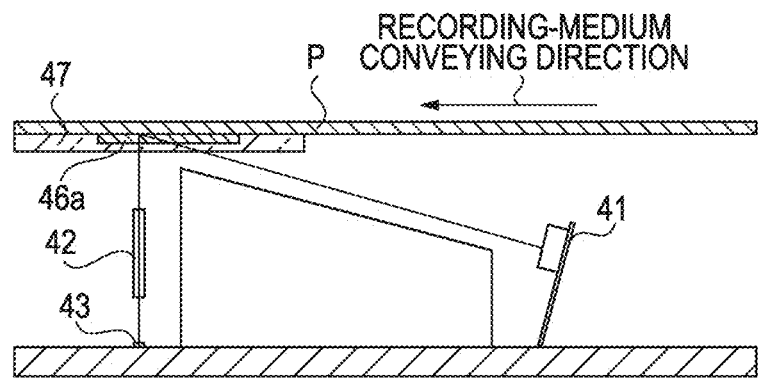
FIG. 31 is a cross-sectional view illustrating a configuration of a recording-medium imaging device according to a modification of the fourth embodiment in which the arrangement of inner reference plates is changed.
Figure 32:
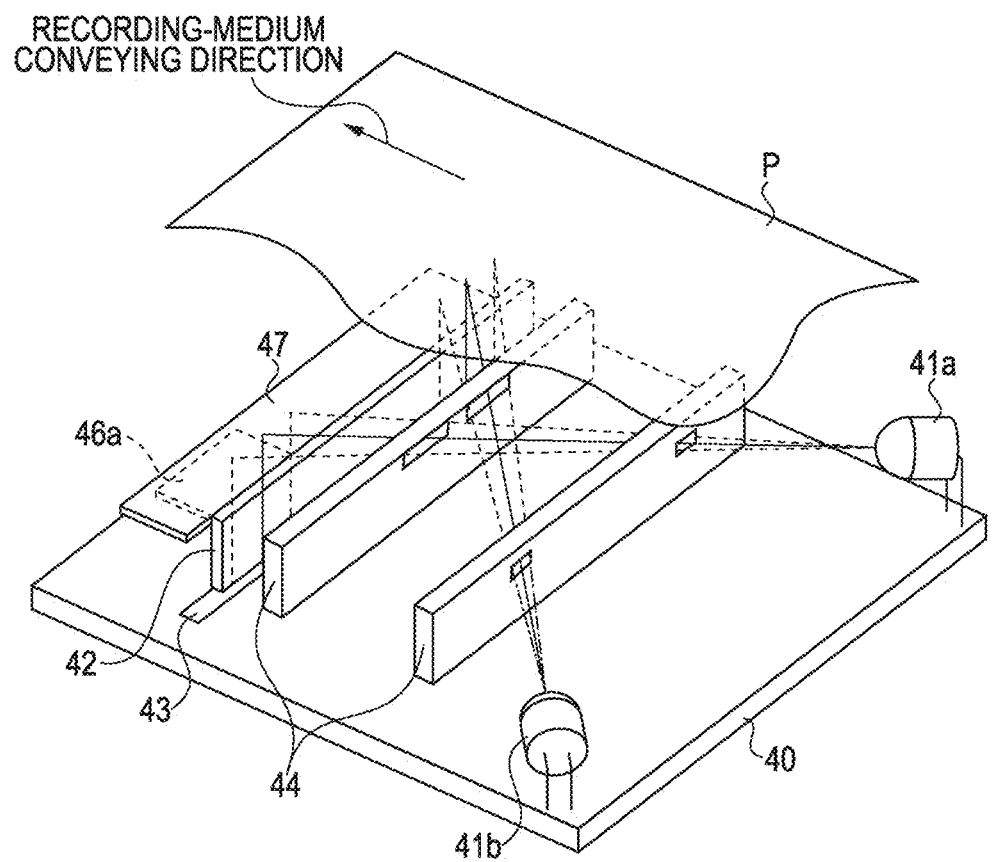
FIG. 32 is a perspective view illustrating a configuration of a recording-medium imaging device according to another modification of the fourth embodiment in which a plurality of LEDs are provided.
Figure 33:
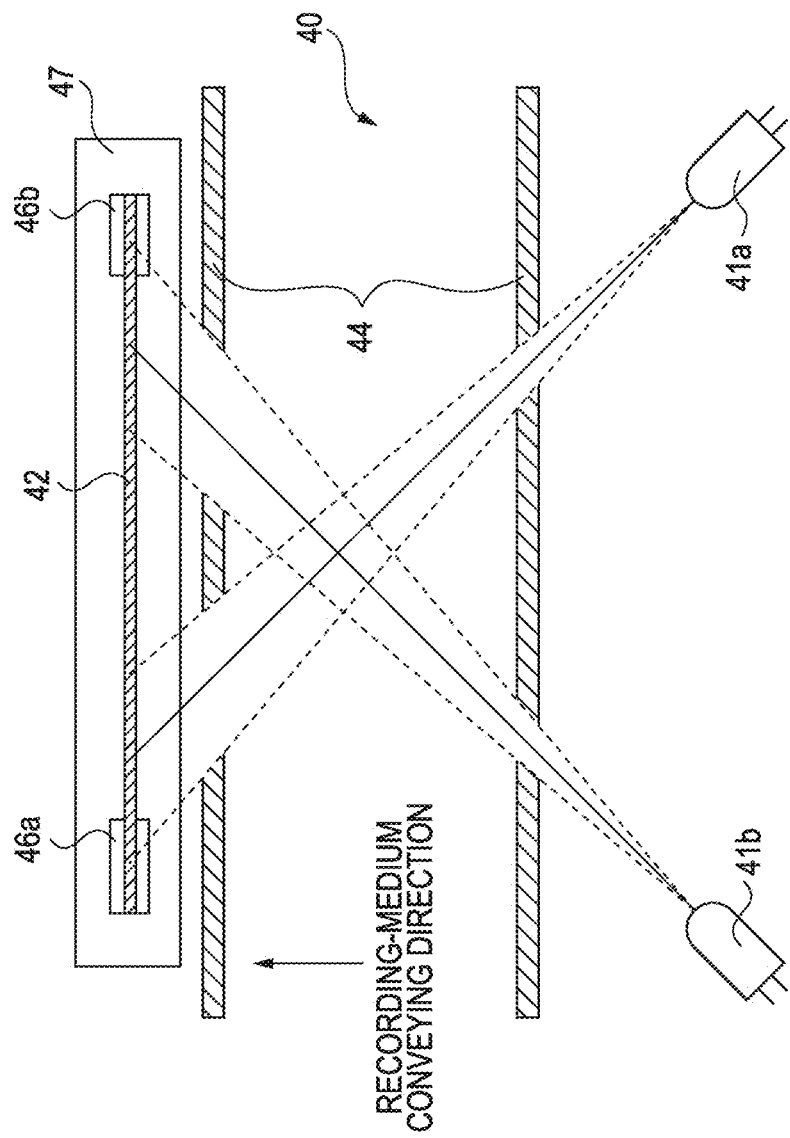
FIG. 33 is a sectional top view illustrating the recording-medium imaging device including the LEDs.

While the inner reference plates 46a and 46b are in contact with the protective member 47 in the above description, they may be placed on a surface of the protective member 47, as shown in FIG. 31. FIGS. 32 and 33 show structures of the inner reference plates 46a and 46b adopted when a plurality of light sources are provided as irradiation units. FIG. 32 is a perspective view illustrating a configuration including a plurality of irradiation units, and this configuration is different from that shown in FIG. 24A in that there are provided a plurality of LEDs 41a and 41b serving as irradiation units and slit structure members 44 for guiding light emitted from the LEDs 41a and 41b in arbitrary directions. FIG. 33 is a cross-sectional view of the configuration which is different from that shown in FIG. 25 in the number of LEDs 41 and arrangement of the slit structure members 44, similarly to FIG. 32. The optical axis of the LED 41a is shifted counterclockwise by 45 degrees (+45 degrees) from the conveying direction of the recording medium P, and the optical axis of the LED 41b is shifted clockwise by 45 degrees (−45 degrees) from the conveying direction of the recording medium P. The slit structure members 44 prevent light emitted from the LED 41a and light emitted from the LED 41b from irradiating the same area, and control irradiation directions of the LEDs 41a and 41b so as to accurately apply the light onto the surface of the recording medium P. Inner reference plates 46a and 46b respectively correspond to the LEDs 41a and 41b, and are located on the outer sides of the optical axes of the LEDs 41a and 41b (closer to ends of a CMOS line sensor 43). This is because, if the inner reference plates 46a and 46b are located on the inner sides (closer to the center of the CMOS line sensor 43), they block light to be applied onto the recording medium P, and this appears as shadows in the surface image of the recording medium P.

Even when a plurality of light sources are thus provided as irradiation units, since the inner reference plates 46a and 46b are provided between the recording medium P and the CMOS line sensor 43, surface images of the inner reference plates 46a and 46b can also be picked up during a time period when a surface image of the recording medium P is picked up. This allows the light quantity to be corrected on the surface images of the inner reference plates 46a and 46b even when the conveying interval of recording media is short during continuous printing.

Fifth Embodiment

Since structures of a fifth embodiment can be realized by those adopted in the first embodiment shown in FIGS. 1 to 4, descriptions thereof are omitted. In the fifth embodiment, in light quantity correction, light-quantity unevenness data for shading correction is appropriately selected in accordance with the light quantity, instead of changing the light quantities of the LEDs 41a and 41b, thereby picking up an accurate surface image.

Figure 34:
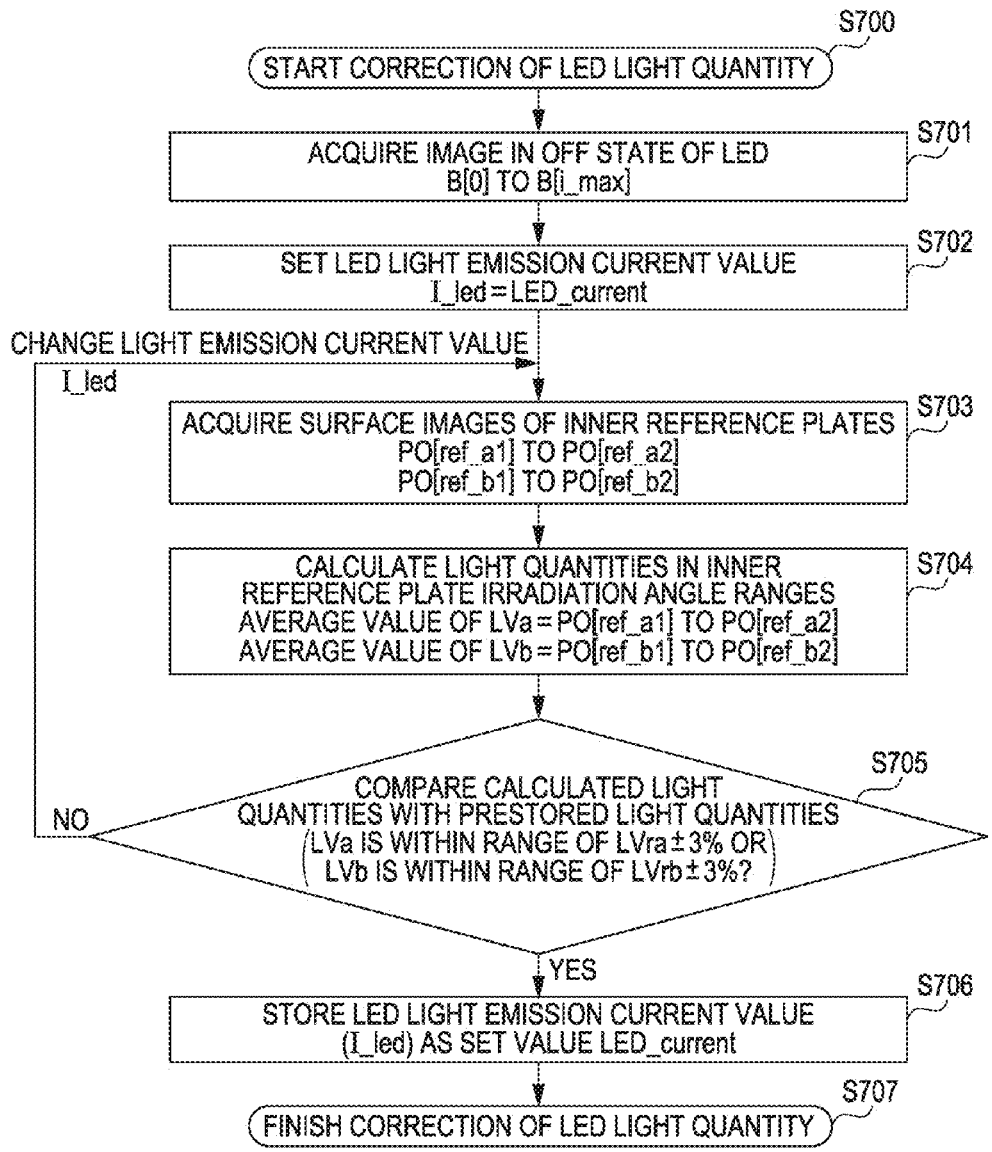
FIG. 34 is a flowchart showing a control procedure for light quantity correction in a recording-medium imaging device according to a fifth embodiment.

A light-quantity correcting operation in the fifth embodiment will be described with reference to a flowchart of FIG. 34. In Step S700, light quantity correction starts. In Step S701, a surface image is acquired with a CMOS line sensor 43 in a state in which an LED 41 is off, and is output as dark current data to an array B[0] to B[i_max]. In Step S702, the LED 41 applies light onto inner reference plates 46a and 46b according to a prestored value I_led. As the value I_led, a value LED_current stored in a storage unit 455 is used. In a case in which light quantity correction has already been performed once or more, since the value LED_current is stored, it is possible to reduce the number of control operations in a loop defined by the following Steps S703 to S705.

In Step S703, the CMOS line sensor 43 images reflected light from the inner reference plates 46a and 46b, and obtains surface information about the inner reference plates 46a and 46b. The obtained information is output to an array PO[ref_a1] to PO[ref_a2] and to an array PO[ref_b1] to PO[ref_b2]. In Step S704, light quantities LVa and LVb of the LED 41 are calculated from the obtained surface images of the inner reference plates 46a and 46b. The light quantities LVa and LVb are calculated as average values of the surface images of the inner reference plates 46a and 46b, as described above.

In Step S705, the calculated light quantities LVa and LVb are compared with prestored light quantities LVra and LVrb of the inner reference plates 46a and 46b so as to correct the value I_led. Since the comparison between the calculated light quantities LVa and LVb and the prestored light quantities LVra and LVrb is similar to that adopted in Step S604 of FIG. 8, a description thereof is omitted. In Step S706, the value I_led is updated as a value LED_current when the condition of Step S705 is satisfied, and a surface image of a recording medium P is acquired on the basis of the value.

Figure 35:
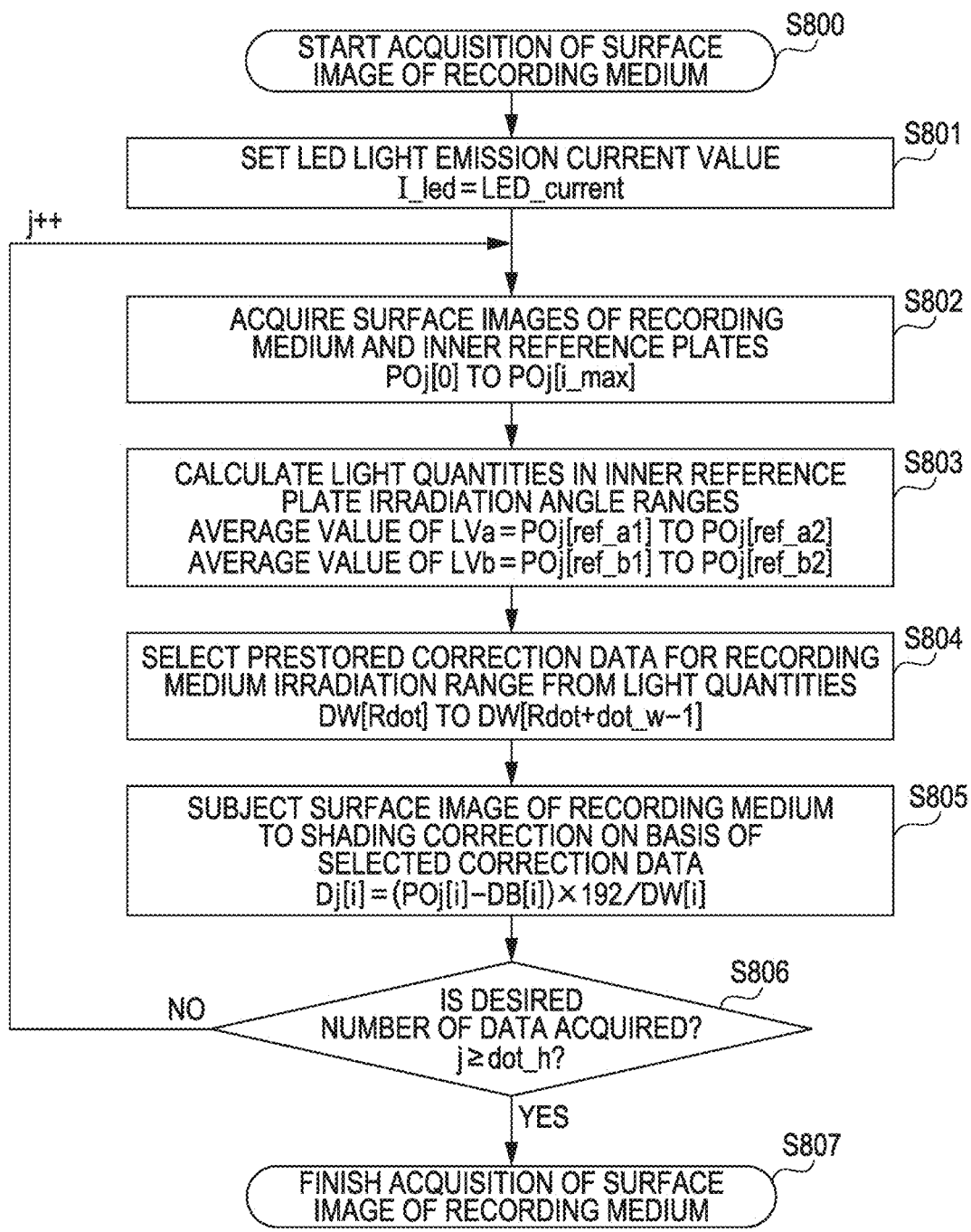
FIG. 35 is a flowchart showing a control procedure for acquisition of a surface image in the recording-medium imaging device of the fifth embodiment.

Next, a description will be given of a method for acquiring a surface image of the recording medium P and conducting shading correction on the acquired surface image, with reference to a flowchart of FIG. 35. In Step S800, acquisition of a surface image starts. In Step S801, the LED 41 applies light onto the recording medium P, which is being conveyed, and the inner reference plates 46a and 46b according to the value LED_current found by the above-described light quantity correction. In Step S802, the CMOS line sensor 43 images reflected light from the recording medium P and the inner reference plates 46a and 46b, and thereby obtains surface images POj[0] to POj[i_max] of the recording medium P and the inner reference plates 46a and 46b.

In Step S803, light quantities LVa and LVb of the LED 41 are calculated on the obtained surface images of the inner reference plates 46a and 46b. In the fifth embodiment, the light quantities LVa and LVb of the LED 41 are not corrected on the basis of the light quantities calculated from the surface information about the inner reference plates 46a and 46b. The optimal light-quantity unevenness data on a recording-medium effective image area is selected in accordance with the light quantities LVa and LVb of the LED 41, and shading correction is conducted on the surface images, thereby obtaining a surface image of the recording medium P. To select the optimal light-quantity unevenness data in accordance with the light quantities LVa and LVb of the LED 41, light-quantity unevenness data obtained when a recording medium for initial adjustment or a reference plate for initial adjustment is irradiated at a plurality of different LED light emission current values are stored in the storage unit 455 beforehand. While light-quantity unevenness data obtained when the light quantity of the recording-medium effective image area is 160, 176, 192, 208, and 224 are stored in the fifth embodiment, the light quantities are not limited thereto. In this case, simultaneously with acquisition of the light-quantity unevenness data, the light quantities LVa and LVb of the inner reference plates 46a and 46b are correspondingly stored as light-quantity unevenness data. Since shading correction is thus performed with the light-quantity unevenness data corresponding to the light quantities LVa and LVb of the LED 41 in the fifth embodiment, an accurate surface image of the recording medium P can be obtained without correcting the light quantity of the LED 41.

In Step S804, optimal shading correction data is selected from the prestored light-quantity unevenness data obtained by irradiation at a plurality of LED light emission current values. For selection, the prestored light quantities of the inner reference plates 46a and 46b are compared with the light quantities LVa and LVb calculated in Step S803. Then, light quantities LVra and LVrb of the inner reference plates 46a and 46b, which coincide with or are closest to the prestored light quantities, are selected. Light-quantity unevenness data DW[Rdot] to DW[Rdot+dot_w−1] of the recording-medium effective image area corresponding to the selected light quantities LVra and LVrb are used for shading correction.

In Step S805, shading correction is conducted on the surface image of the recording medium P according to dark current data DB in an off state of the LED 41 and the selected correction data DW. Since shading correction is performed by a method similar to that adopted in the fourth embodiment, a description thereof is omitted. In Step S806, Steps S802 to S805 are repeated until a prestored required number of pixels dot_h in the conveying direction are obtained. Since shading correction can be performed with the light-quantity unevenness data corresponding to the light quantity of the LED 41, an accurate surface image of the recording medium P can be obtained.

In the fifth embodiment, the light-quantity unevenness data is acquired beforehand when irradiation is performed with light having a plurality of LED light emission current values, and shading correction is performed in accordance with the light quantities LVa and LVb of the LED 41. As another method for performing shading correction without correcting the light quantity, light quantities and a light-quantity variation distribution of the recording-medium effective image area can be calculated from the light quantities and light-quantity variations of the surface images of the inner reference plates 46a and 46b. In this method, there is no need to store a plurality of light-quantity unevenness data beforehand, and this can reduce the storage area.

Sixth Embodiment

Since structures of a sixth embodiment can be realized by those adopted in the first embodiment shown in FIGS. 1 to 4, descriptions thereof are omitted. In the sixth embodiment, an accurate surface image can be picked up by adjusting the light quantity in accordance with the whiteness of a recording medium P. Since a reference brightness is produced on the basis of the surface image of the recording medium P by using inner reference plates 46a and 46b, the whiteness of the recording medium P can be detected. For example, since the output from a CMOS line sensor 43 is low as a whole with respect to paper having a low whiteness such as recycled paper, irregularities of the surface image may be eliminated, and the paper may be erroneously identified as a type of paper that is smoother than it really is. Even in such a case, the whiteness of the recording medium P that is being conveyed is detected, and is compared with a preset whiteness. When it is determined that the detected whiteness is lower or higher than the preset whiteness, the light quantity is changed by changing the light emission current value of an LED 41. By applying light onto a recording medium having a low whiteness, such as recycled paper, or a recording medium having a high regular reflectance with an increased light quantity of the LED 41, a surface image of the recording medium P can be picked up accurately.

Acquisition of a surface image of the recording medium P in the sixth embodiment will be described with reference to a flowchart of FIG. 36. Since Steps S900 to S902 are similar to Steps S700 to S702 of the fifth embodiment shown in FIG. 34, descriptions thereof are omitted.

In Step S903, the CMOS line sensor 43 images reflected light from the recording medium P and obtains a surface image PO[Rdot] to PO[Rdot+dot_w−1] of the recording medium P. In Step S904, a light quantity LV of a recording-medium effective image area is calculated from the obtained surface image of the recording medium P. The light quantity LV is calculated as an average value of the surface image in the effective image area of the recording medium P, as described above.

In Step S905, the light quantity LV is compared with a prestored light quantity LVr. When the condition is not satisfied, the value I_led is changed and measurement is performed again. The value I_led is updated as LED_current when the condition of Step S905 is satisfied, and a surface image of the recording medium P is acquired on the basis of the value. Since the updated value LED_current corresponds to the whiteness of the recording medium P, the type of the recording medium P can be identified on the basis of LED_current.

In Step S906, the LED 41 applies light onto the recording medium P and the inner reference plates 46a and 46b on the basis of the updated value LED_current. The CMOS line sensor 43 images reflected light from the recording medium P and the inner reference plates 46a and 46b, and obtains surface information POj[0] to POj[i_max] about the recording medium P and the inner reference plates 46a and 46b. In Step S907, light quantities LVa and LVb are calculated from the obtained surface images of the inner reference plates 46a and 46b. The light quantities LVa and LVb are calculated as an average value of the surface image POj[ref_a1] to POj[ref_a2] of the inner reference plate 46a and an average of the surface image POj[ref_b1] to POj[ref_b2] of the inner reference plate 46b.

In Step S908, optimal correction data is selected from correction data obtained by irradiation with light having a plurality of prestored values LED_current. For selection, a plurality of stored light quantities of the inner reference plates 46a and 46b are compared with the light quantities LVa and LVb calculated in Step S907. Then, light quantities LVra and LVrb of the inner reference plates 46a and 46b, which coincide with or are closest to the stored light quantities, are selected. Light-quantity unevenness data DW[Rdot] to DW[Rdot+dot_w−1] in a recording-medium effective image area of the selected light quantities LVra and LVrb are used for shading correction.

In Step S909, shading correction is conducted on the surface image of the recording medium P on the basis of the dark current data in the off state of the LED 41 and the selected correction data described above. Since a method of shading correction is similar to that adopted in the above-described first embodiment, a description thereof will be omitted. In Step S910, Steps S906 to S908 are repeated until a prestored required number of pixels dot_h in the conveying direction are obtained. Thus, shading correction can be performed according to the light-quantity unevenness data corresponding to the light quantity of the LED 41, and therefore, an accurate surface image of the recording medium P can be obtained.

In this way, the type of the recording medium P can be identified on the basis of two parameters, that is, the value LED_current obtained from the surface image and the surface image of the recording medium P. By identifying the type of the recording medium on the basis of two feature values, that is, the surface image and whiteness, identification of the recording medium P can be performed accurately.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A recording-medium detecting device comprising:
    a reference plate configured to reflect light;
    an emission unit configured to emit light onto a recording medium and the reference plate; and
    a receiving unit configured to receive reflected light from the recording medium at a first receiving portion and to receive reflected light from the reference plate at a second receiving portion,
    wherein the reference plate is provided closer to the receiving unit than the recording medium onto which the emission unit emits the light, and
    wherein the reference plate is provided so that a part of the reference plate is positioned between both ends of the recording medium onto which the emission unit emits the light, in a direction perpendicular to a conveying direction of the recording medium, and a region where the emission unit emits light onto the recording medium and a region where the emission unit emits light onto the reference plate are arranged side by side in the direction perpendicular to the conveyance direction of the recording medium.

2. The recording-medium detecting device according to claim 1, wherein the receiving unit receives the reflected light from the recording medium at the first receiving portion to obtain an image of the recording medium and the receiving unit receives reflected light from the reference plate at the second receiving portion to obtain an image of the reference plate.

3. The recording-medium detecting device according to claim 2, further comprising:
    a control unit configured to identify a type of the recording medium based on the image of the recording medium.

4. The recording-medium detecting device according to claim 3, wherein the control unit identifies a surface state of the recording medium based on the image of the recording medium.

5. The recording-medium detecting device according to claim 2, wherein the reference plate is used to adjust a light quantity from the emission unit according to a light quantity of the reflected light from the reference plate.

6. The recording-medium detecting device according to claim 5, wherein the light quantity of the reflected light from the reference plate is obtained from data on the image of the reference plate.

7. The recording-medium detecting device according to claim 6, wherein the light quantity of the reflected light from the reference plate is obtained from data on the image of the reference plate except a portion corresponding to reflected light from an end of the reference plate.

8. The recording-medium detecting device according to claim 2, further comprising:
    a storage unit configured to store a plurality of pieces of correction data for correcting data on the image of the recording medium,
    wherein the reference plate is used to select correction data from among the plurality of pieces of correction data stored in the storage unit according to a light quantity of the reflected light from the reference plate.

9. The recording-medium detecting device according to claim 8, wherein the light quantity of the emitted light from the emission unit is adjusted according to the light quantity of the reflected light from the recording medium, and, after the light quantity of the emitted light from the emission unit is adjusted, the correction data is selected from among the plurality of pieces of correction data stored in the storage unit according to the light quantity of the reflected light from the reference plate.

10. The recording-medium detecting device according to claim 1, wherein the reference plate is fixed.

11. The recording-medium detecting device according to claim 1, wherein the first receiving portion and the second receiving portion simultaneously receives the reflected light from the recording medium and the reflected light from the reference plate.

12. The recording-medium detecting device according to claim 1, wherein, after the receiving unit receives the reflected light from the recording medium at the first receiving portion, an image is formed on the recording medium.

13. The recording-medium detecting device according to claim 1, wherein a reflective portion of the recording medium on which the light is reflected is opposed to the receiving unit.

14. The recording-medium detecting device according to claim 1, wherein the reference plate is provided so that an entirety of the reference plate is positioned between both ends of the recording medium onto which the emission unit emits the light, in the direction perpendicular to the conveying direction of the recording medium.

15. An image forming apparatus comprising:
    an image forming unit configured to form an image;
    a reference plate configured to reflect light;
    an emission unit configured to emit light onto a recording medium and the reference plate; and
    a receiving unit configured to receive reflected light from the recording medium at a first receiving portion and to receive reflected light from the reference plate at a second receiving portion,
    wherein the reference plate is provided closer to the receiving unit than the recording medium onto which the emission unit emits the light,
    wherein the reference plate is provided so that a part of the reference plate is positioned between both ends of the recording medium onto which the emission unit emits the light, in a direction perpendicular to a conveying direction of the recording medium, and a region where the emission unit emits light onto the recording medium and a region where the emission unit emits light onto the reference plate are arranged side by side in the direction perpendicular to the conveyance direction of the recording medium, and wherein an image forming condition of the image forming unit is controlled on the basis of the reflected light from the recording medium.

16. The image forming apparatus according to claim 15, wherein the receiving unit receives the reflected light from the recording medium at the first receiving portion to obtain an image of the recording medium and the receiving unit receives reflected light from the reference plate at the second receiving portion to obtain an image of the reference plate.

17. The image forming apparatus according to claim 16, further comprising:
a control unit configured to control the image forming condition of the image forming unit based on the image of the recording medium.

18. The image forming apparatus according to claim 16, wherein the reference plate is used to adjust a light quantity from the emission unit according to a light quantity of the reflected light from the reference plate.

19. The image forming apparatus according to claim 18, wherein the light quantity of the reflected light from the reference plate is obtained from data on the image of the reference plate.

20. The image forming apparatus according to claim 19, wherein the light quantity of the reflected light from the reference plate is obtained from data on the image of the reference plate except a portion corresponding to reflected light from an end of the reference plate.

21. The image forming apparatus according to claim 16, further comprising:
a storage unit configured to store a plurality of pieces of correction data for correcting data on the image of the recording medium,
wherein the reference plate is used to select correction data from among the plurality of pieces of correction data stored in the storage unit according to a light quantity of the reflected light from the reference plate.

22. The image forming apparatus according to claim 21, wherein the light quantity of the emitted light from the emission unit is adjusted according to the light quantity of the reflected light from the recording medium, and, after the light quantity of the emitted light from the emission unit is adjusted, the correction data is selected from among the plurality of pieces of correction data stored in the storage unit according to the light quantity of the reflected light from the reference plate.

23. The image forming apparatus according to claim 15, wherein the reference plate is fixed.

24. The image forming apparatus according to claim 15, wherein the first receiving portion and the second receiving portion simultaneously receives the reflected light from the recording medium and the reflected light from the reference plate.

25. The image forming apparatus according to claim 15, wherein, after the receiving unit receives the reflected light from the recording medium at the first receiving portion, an image is formed on the recording medium.

26. The image forming apparatus according to claim 15, wherein a reflective portion of the recording medium on which the light is reflected is opposed to the receiving unit.

27. The image forming apparatus device according to claim 15, wherein the reference plate is provided so that an entirety of the reference plate is positioned between both ends of the recording medium onto which the emission unit emits the light, in the direction perpendicular to the conveying direction of the recording medium.

28. The image forming apparatus according to claim 15, wherein the image forming condition is a voltage applied to a transfer unit included in the image forming unit.

29. The image forming apparatus according to claim 15, wherein the image forming condition is a conveying speed of a recording medium.

30. The image forming apparatus according to claim 15, wherein the image forming condition is a temperature of a fixing unit included in the image forming unit.

31. A recording-medium identifying device comprising:
an emission unit configured to emit light;
a receiving unit configured to receive light emitted by the emission unit via a reference plate or a first recording medium serving as a reference and to obtain a first image including a plurality of pixels, and configured to subsequently receive light emitted by the emission unit via a second recording medium and obtain a second image including a plurality of pixels;
a control unit configured to select an effective image area corresponding to a pixel having an output value that is equal to or more than a predetermined threshold value within a plurality of pixels included in the first image;
a storage unit configured to store the effective image area selected by the control unit,
wherein, after the control unit causes the storage unit to store the effective image area, the control unit identifies a type of the second recording medium based on the output value of the pixel corresponding to the effective image area within a plurality of pixels included in the second image.

32. The recording-medium identifying device according to claim 31, wherein the control unit identifies a surface state of the second recording medium based on the output value of the pixel corresponding to the effective image area.

33. The recording-medium identifying device according to claim 31, wherein the receiving unit receives light emitted by the emission unit and reflected from the second recording medium and obtains the second image.

34. The recording-medium identifying device according to claim 33, wherein the receiving unit receives light emitted by the emission unit and reflected from the second recording medium that is being conveyed, and obtains the second image.

35. The recording-medium identifying device according to claim 31, wherein the control unit selects an effective image area corresponding to a plurality of pixels each having an output value that is more than or equal to a predetermined threshold value within a plurality of pixels included in the first image.

36. The recording-medium identifying device according to claim 35, wherein, in a case where there are a plurality of areas that correspond to a plurality of pixels each having an output value that is more than or equal to a threshold value, the control unit selects an area including a largest number of the pixels each having an output value that is more than or equal to the threshold value, as the effective image area.

37. The recording-medium identifying device according to claim 35, wherein, in a case where a number of pixels included in the effective image area is less than a number of pixels required for identifying a type of the recording medium, the control unit lowers the threshold value so that the number of pixels included in the effective image area increases.

38. The recording-medium identifying device according to claim 35, wherein, in a case where a number of pixels included in the effective image area is less than a number of pixels required for identifying a type of the recording medium, the control unit increases an imaging area in a conveying direction of the recording medium.

39. An image forming apparatus comprising:
an image forming unit configured to form an image;
an emission unit configured to emit light;
an receiving unit configured to receive light emitted by the emission unit via a reference plate or a first recording medium serving as a reference and to obtain a first image including a plurality of pixels, and configured to subsequently receive light emitted by the emission unit via a second recording medium and obtain a second image including a plurality of pixels;

a control unit configured to select an effective image area corresponding to a pixel having an output value that is more than or equal to a predetermined threshold value within a plurality of pixels included in the first image; and a storage unit configured to store the effective image area selected by the control unit, wherein, after the control unit causes the storage unit to store the effective image area, the control unit controls an image forming condition of the image forming unit with respect to the second recording medium based on the output value of the pixel corresponding to the effective image area within a plurality of pixels included in the second image.

40. The image forming apparatus according to claim 39, wherein the image forming condition is a voltage applied to a transfer unit included in the image forming unit.

41. The image forming apparatus according to claim 39, wherein the image forming condition is a conveying speed of a recording medium.

42. The image forming apparatus according to claim 39, wherein the image forming condition is a temperature of a fixing unit included in the image forming unit.

43. The image forming apparatus according to claim 39, wherein the receiving unit receives light emitted by the emission unit and reflected from the second recording medium and obtains the second image.

44. The image forming apparatus according to claim 43, wherein the receiving unit receives light emitted by the emission unit and reflected from the second recording medium that is being conveyed, and obtains the second image.

45. The image forming apparatus according to claim 39, wherein the control unit selects an effective image area corresponding to a plurality of pixels each having an output value that is more than or equal to a predetermined threshold value within a plurality of pixels included in the first image.

46. The image forming apparatus according to claim 45, wherein, in a case where there are a plurality of areas that correspond to a plurality of pixels each having an output value that is more than or equal to a threshold value, the control unit selects an area including a largest number of the pixels each having an output value that is more than or equal to the threshold value, as the effective image area.

47. The image forming apparatus according to claim 45, wherein, in a case where a number of pixels included in the effective image area is less than a number of pixels required for identifying a type of the recording medium, the control unit lowers the threshold value so that the number of pixels included in the effective image area increases.

48. The image forming apparatus according to claim 45, wherein, in a case where a number of pixels included in the effective image area is less than a number of pixels required for identifying a type of the recording medium, the control unit increases an imaging area in a conveying direction of the recording medium.

49. The recording-medium identifying device according to claim 31, wherein the receiving unit receives light emitted by the emission unit and reflected from the reference plate or the first recording medium and obtains the first image.

50. The image forming apparatus according to claim 39, wherein the receiving unit receives light emitted by the emission unit and reflected from the reference plate or the first recording medium and obtains the first image.

\* \* \* \* \*